(12) United States Patent
Park et al.

(10) Patent No.: US 8,625,716 B2
(45) Date of Patent: Jan. 7, 2014

(54) METHOD AND APPARATUS FOR PERFORMING HARQ IN WIRELESS COMMUNICATION SYSTEM

(75) Inventors: Hyung Ho Park, Gyeongki-do (KR); Jin Sam Kwak, Gyeongki-do (KR); Suk Woo Lee, Gyeongki-do (KR); Seung Hyun Kang, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 1057 days.

(21) Appl. No.: 12/638,961

(22) Filed: Dec. 15, 2009

(65) Prior Publication Data

US 2010/0166111 A1 Jul. 1, 2010

Related U.S. Application Data

(60) Provisional application No. 61/122,740, filed on Dec. 16, 2008, provisional application No. 61/151,805, filed on Feb. 11, 2009, provisional application No. 61/153,647, filed on Feb. 19, 2009, provisional application No. 61/155,500, filed on Feb. 25, 2009, provisional application No. 61/159,790, filed on Mar. 12, 2009, provisional application No. 61/172,223, filed on Apr. 24, 2009.

(51) Int. Cl.
  *H04L 27/36* (2006.01)
(52) U.S. Cl.
  USPC ........... 375/298; 375/267; 375/260; 375/299; 375/347; 375/349
(58) Field of Classification Search
  USPC .................. 375/267, 260, 299, 347, 349, 298
  See application file for complete search history.

(56) References Cited

U.S. PATENT DOCUMENTS

| 2006/0040700 | A1  | 2/2006 | Roberts et al. | |
|---|---|---|---|---|
| 2009/0041110 | A1* | 2/2009 | Malladi | 375/240 |
| 2009/0052473 | A1* | 2/2009 | Choi et al. | 370/498 |

FOREIGN PATENT DOCUMENTS

| JP | 2005-027336 | 1/2005 |
|---|---|---|
| KR | 10-2006-0052441 | 5/2006 |
| KR | 10-2008-0024419 | 3/2008 |
| WO | 03/009633 | 1/2003 |
| WO | 2006/109161 | 10/2006 |

OTHER PUBLICATIONS

CDG, "Recommended System Selection Requirements for 1X and 1xEV-DO-Capable Terminals", CDG Document 143,Version 1.1, Mar. 2007, XP-002599308.

\* cited by examiner

*Primary Examiner* — Kabir A Timory
(74) *Attorney, Agent, or Firm* — Lee, Hong, Degerman, Kang & Waimey

(57) ABSTRACT

A method and an apparatus for performing hybrid automatic repeat request (HARQ) using constellation rearrangement and a circular buffer in a wireless communication system is provided. An encoded information bit is stored into a circular buffer. A transport block in selected from the circular buffer. A bit set comprising n bits of the transport block is mapped to a data symbol on a constellation for $2^n$-QAM modulation according to a first mapping order. The bit set is mapped according to a second mapping order when the bits of the transport block are subject to wrap-around at the end of the circular buffer.

6 Claims, 24 Drawing Sheets

METHOD AND APPARATUS FOR PERFORMING HARQ IN WIRELESS COMMUNICATION SYSTEM

CROSS-REFERENCE TO RELATED APPLICATIONS

This application claims the benefit of priority of U.S. Provisional applications No. 61/122,740 filed on Dec. 16, 2008, U.S. Provisional applications No. 61/151,805 filed on Feb. 11, 2009, U.S. Provisional applications No. 61/153,647 filed on Feb. 19, 2009, U.S. Provisional applications No. 61/155,500 filed on Feb. 25, 2009, U.S. Provisional applications No. 61/159,790 filed on Mar. 12, 2009, and U.S. Provisional applications No. 61/172,223 filed on Apr. 24, 2009, all of which are incorporated by reference in their entirety herein.

BACKGROUND OF THE INVENTION

1. Field of the Invention

The present invention provides wireless communications, and more particularly, to a method and apparatus for performing hybrid automatic repeat request (HARQ) using constellation rearrangement and a circular buffer in a wireless communication system.

2. Related Art

Wireless communication has recently been developed to satisfy requirements of high spectral efficiency and reliable communication. However, a fading channel environment and an interference caused by various factors result in a packet error which limits overall system capacity.

Hybrid automatic repeat request (HARQ) is an automatic repeat request (ARQ) protocol combined with forward error correction (FEC) and is strongly considered as one of cutting edge technologies for future reliable communication. The HARQ scheme can largely be classified into two types. One is chase combining (CC) HARQ which is introduced in D. Chase, Code Combining A maximum-likelihood decoding approach for combining an arbitrary number of noisy packets, IEEE Trans. on Commun., Vol. 33, pp. 593-607, May 1985. The other is increment redundancy (IR) HARQ. In the CC HARQ, when a receiver detects an error through cyclic redundancy checking (CRC) while decoding the transmitted packet, the same packet with the same modulation and coding is retransmitted to the receiver. Meanwhile, the IR HARQ retransmits different packets in which parity bits may be manipulated through puncturing or repetition in order to obtain a coding gain.

A multiple input multiple output (MIMO) system is one of promising techniques researched for wireless communication. It is known that spatial diversity significantly increases system capacity without an additional bandwidth by constructing multiple antennas in both of a transmitter and a receiver. Consequently, there is ongoing research on a method of using a transmit diversity gain and a receive diversity gain.

Meanwhile, constellation rearrangement is one of methods for improving an HARQ gain by averaging a reliability difference between constitutional element bits in a quadrature amplitude modulation (QAM) constellation. The constellation rearrangement method may apply for multi-modulation transmission, may apply for a MIMO system using HARQ, and may apply for the support of increment redundancy (IR). The constellation rearrangement introduced in PCT International Unexamined Patent Publication No. WO 2008/018742 filed by the present Applicant provides an additional gain by averaging an intrinsic reliability difference between element bits.

In addition, a circular buffer has one of data structures using a fixed-sized buffer. In a process of storing data in the circular buffer, the data is stored in the circular buffer as if the front and the end of the buffer are in contact with each other. The circular buffer may be used to temporarily store an information bit when the information bit is mapped to a data symbol on the constellation. In particular, the circular buffer may be used for data retransmission when HARQ is performed. After the bit at the end of the buffer is transmitted, if it is required to transmit more information bits, the bits are subject to wrap-around at the end of the buffer and they are transmitted starting from the bit in the front of the buffer.

Accordingly, there is a need to provide a further effective method for performing HARQ by using the constellation rearrangement and the circular buffer.

SUMMARY OF THE INVENTION

The present invention provides a method and apparatus for performing hybrid automatic repeat request (HARQ) in a wireless communication system.

In an aspect, a method of performing hybrid automatic repeat request (HARQ) in a wireless communication system is provided. The method includes storing an encoded information bit into a circular buffer, selecting a transport block from the circular buffer, and mapping a bit set comprising n bits of the transport block to a data symbol on a constellation for $2^n$-QAM modulation according to a first mapping order, wherein the bit set is mapped according to a second mapping order when the bits of the transport block are subject to wrap-around at the end of the circular buffer. The method may further includes transmitting to a mobile station a constellation rearrangement version (CRV) for indicating a mapping order of the bit set, wherein the CRV is modified when the bits of the transport block are subject to wrap-around at the end of the circular buffer. The first mapping order may be $\{b_0, \ldots, b_{n-1}\}$, and the second mapping order is $\{b_{n-1}, \ldots, b_0\}$. n may be 4 or 6.

The mapping to the data symbol includes mapping a first bit set comprising n bits of the transport block to a first data symbol, and mapping a second bit set comprising n bits of the transport block to a second data symbol. If the first bit set is $\{b_0,b_1,b_2,b_3\}$ and the second bit set is $\{b_4,b_5,b_6,b_7\}$, the first mapping order may be $\{b_0,b_1,b_2,b_3\}$ and $\{b_4,b_5,b_6,b_7\}$, respectively, and the second mapping order may be $\{b_1,b_4,b_3,b_6\}$ and $\{b_5,b_0,b_7,b_2\}$, respectively. If the first bit set is $\{b_0,b_1,b_2,b_3,b_4,b_5\}$ and the second bit set is $\{b_6,b_7,b_8,b_9,b_{10},b_{11}\}$, the first mapping order may be $\{b_0,b_1,b_2,b_3,b_4,b_5\}$ and $\{b_6,b_7,b_8,b_9,b_{10},b_{11}\}$, respectively, and the second mapping order may be $\{b_2,b_7,b_0,b_5,b_{10},b_3\}$ and $\{b_5,b_1,b_6,b_{11},b_4,b_9\}$, respectively.

In another aspect, a method of performing hybrid automatic repeat request (HARQ) in a wireless communication system is provided. The method includes storing an encoded information bit into a circular buffer, selecting a first transport block from the circular buffer, mapping a bit set comprising n bits of the first transport block to a data symbol on a constellation for $2^n$-QAM modulation according to a first mapping order, transmitting the data symbol of the first transport block, receiving a retransmission request for the information bit, selecting a second transport block for retransmission of the information bit from the circular buffer, mapping a bit set comprising n bits of the second transport block to a data symbol on a constellation for $2^n$-QAM modulation, and transmitting the data symbol of the second transport block, wherein a bit set of the first transport block or the second transport block is mapped according to a second mapping order when bits of the first transport block or the second transport block are subject to wrap-around at the end of the circular buffer.

In another aspect, a transmitter in a wireless communication system is provided. The transmitter includes a circular buffer configured to store an encoded information bit, a mapper configure to select a transport block from the circular buffer and map a bit set comprising n bits of the transport block to a data symbol on a constellation for $2^n$-QAM modulation according to a first mapping order, and a radio frequency (RF) unit coupled to the mapper, wherein the mapper maps the bit set according to a second mapping order when the bits of the transport block are subject to wrap-around at the end of the circular buffer.

DESCRIPTION OF EXEMPLARY EMBODIMENTS

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16m.

Figure 1:
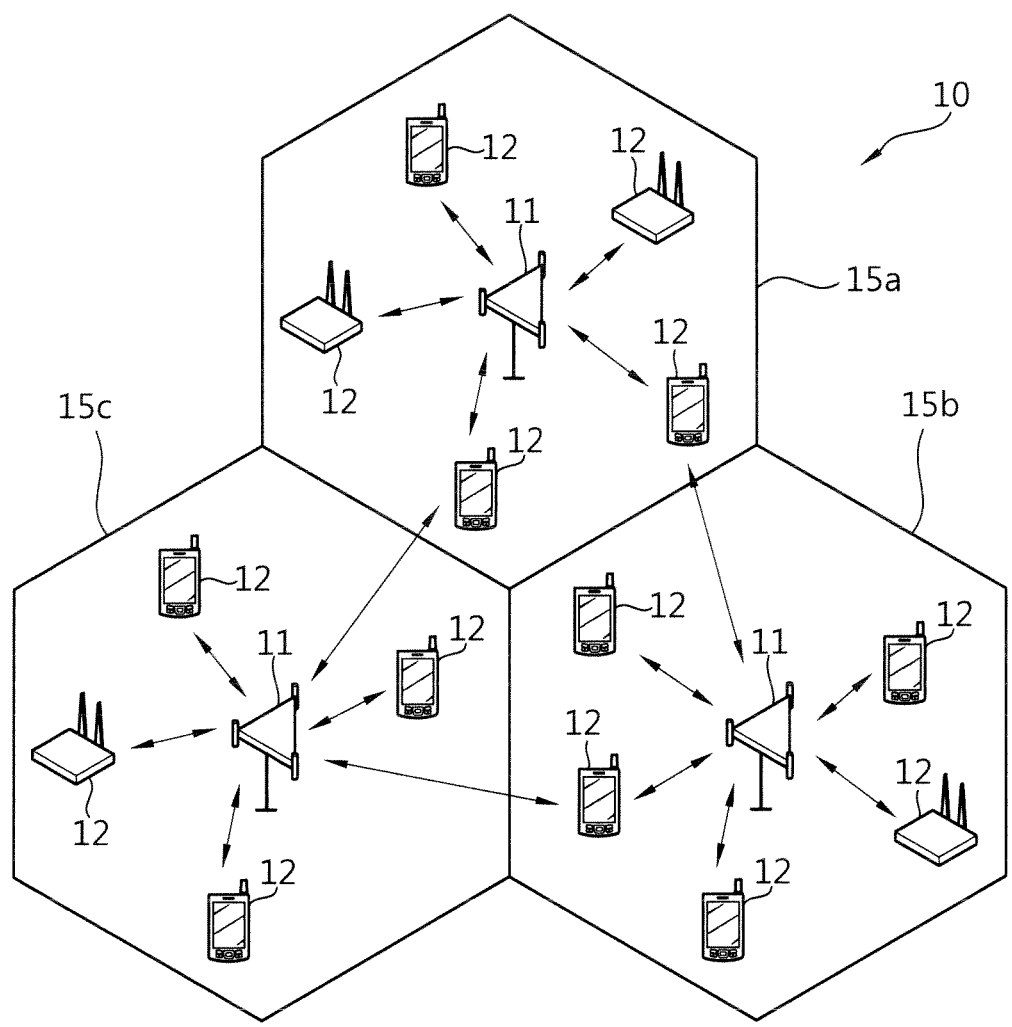
FIG. 1 shows a wireless communication system.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

An institute of electrical and electronics engineers (IEEE) 802.16m system performs channel coding and modulation on data in a process of transmitting the data. Information bits are segmented into forward error correction (FEC) blocks and are subject to FEC encoding. Subcarriers of a logical resource unit (LRU) are segmented into the respective FEC blocks. In addition, a bit selection process and a bit repetition process are performed to achieve rate matching. The bit selection process is performed to adjust the number of coded bit to either the LRU or a resource allocation size depending on a subframe type. The bit repetition process is performed when the number of bits to be transmitted is greater than the number of selected bits. Modulation is performed on bits that have undergone the selection and repetition processes.

Figure 2:
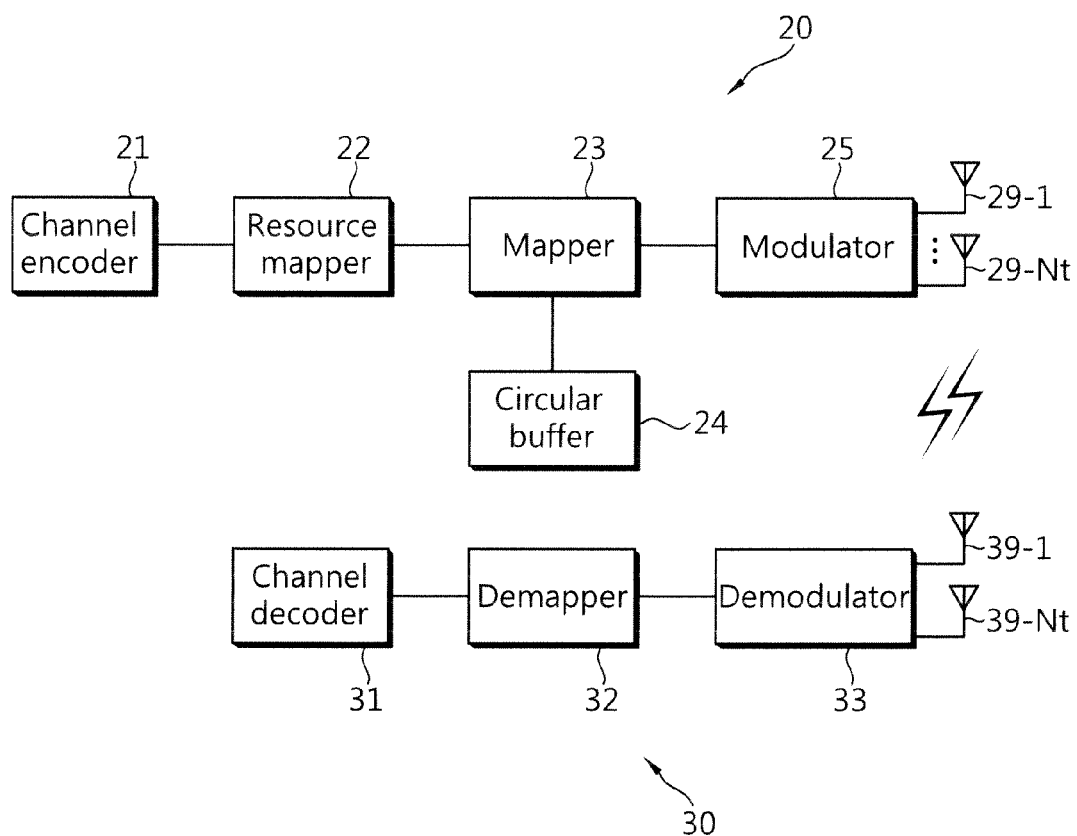
FIG. 2 is a block diagram showing a transmitter and a receiver according to an embodiment of the proposed invention.

FIG. 2 is a block diagram showing a transmitter and a receiver according to an embodiment of the proposed invention.

A transmitter 20 and a receiver 30 implement hybrid automatic repeat request (HARQ). The transmitter 20 and the receiver 30 may be a transceiver for performing both a transmission function and a reception function. For clear explanation on data retransmission, it will be described hereinafter that one side that serves for data transmission and retransmission is referred to as the transmitter 20 and the other side that receives data and requests retransmission is referred to as the receiver 30. In a downlink, the transmitter 20 may be part of a base station (BS), and the receiver 30 may be a part of a user equipment (UE). In an uplink, the transmitter 20 may be a part of the UE, and the receiver 30 may be a part of the BS. The BS may include a plurality of transmitters 20 and a plurality of receivers 30. The UE may include a plurality of transmitters 20 and a plurality of receivers 30.

Referring to FIG. 2, the transmitter 20 includes a channel encoder 21, a resource mapper 22, a mapper 23, a circular buffer 24, a modulator 25, and transmit (Tx) antennas 29-1, . . . , 29-Nt.

The channel encoder 21 receives a stream of information bits, and generates coded data by encoding the received stream of information bits according to a predetermined coding scheme. The resource mapper 23 allocates a resource for transmitting the coded data. The mapper 23 provides a data symbol by modulating the coded data according to a predetermined modulation scheme. The mapper 23 may use at least two or more modulation schemes. The mapper 23 maps the coded data to a data symbol representing a position on a signal constellation. Further, the mapper 23 remaps the coded data according to a retransmission request signal. There is no restriction on the modulation scheme used by the mapper 23. The modulation scheme may be M-quadrature amplitude modulation (M-QAM). Examples of the M-QAM include 16-QAM and 64-QAM. The circular buffer 24 temporarily stores data when the coded data is mapped to the data symbol. The modulator 25 modulates the data symbol output from the mapper 23 and transmits the modulated data symbol through each of the Tx antennas 29-1, . . . , 29-Nt.

The receiver 30 includes a channel decoder 31, a demapper 32, a demodulator 33, and receive (Rx) antennas 39-1, . . . , 39-Nr. Signals received from the Rx 39-1, . . . , 39-Nr are demodulated by the demodulator 33. The demapper 32 demaps the coded data from the data symbol according to a demapping control signal. The channel decoder 31 decodes the coded data according to a predetermined decoding scheme.

The M-QAM modulation scheme maps n bits (where $M=2^n$) to one data symbol on a constellation. Since the n bits mapped to one data symbol are concurrently transmitted, transmission efficiency can be improved. For example, when using the 16-QAM modulation scheme, since $16=2^4$, 4-bit information $\{b_0,b_1,b_2,b_3\}$ may be mapped to one data symbol. The $\{b_0,b_1,b_2,b_3\}$ can be mapped in any order without restriction.

Figure 3:
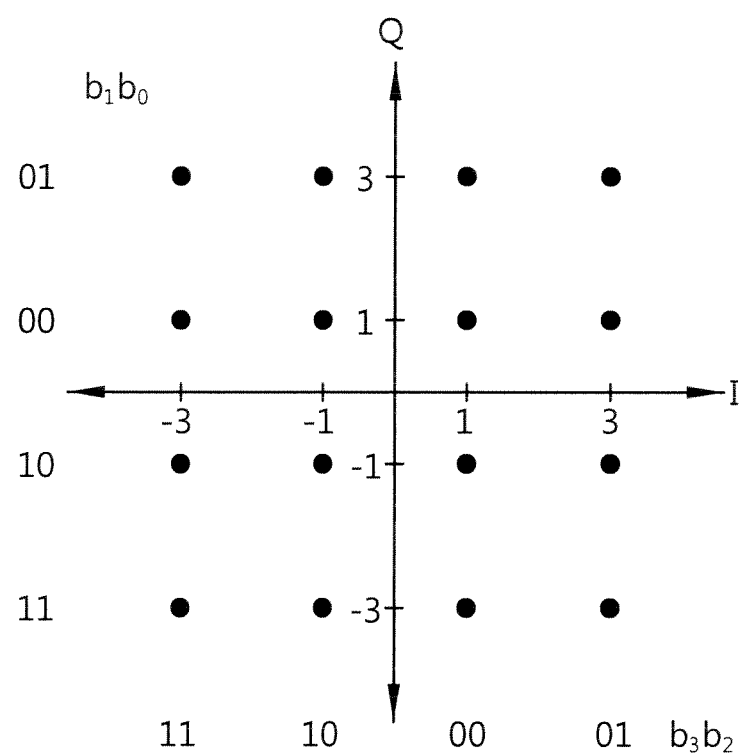
FIG. 3 shows an example of a constellation of a 16-quadrature amplitude modulation (QAM) modulation scheme.

FIG. 3 shows an example of a constellation of a 16-QAM modulation scheme. Referring to FIG. 3, the constellation consists of two constitutional elements, i.e., in-phase (hereinafter I-axis) and quadrature (hereinafter Q-axis). The I-axis consists of 2 bits of $b_3b_2$, and the Q-axis consists of 2 bits of $b_1b_0$. However, this is for exemplary purposes only, and the I-axis and the Q-axis can use all combinations of the constitutional elements while avoiding the respective 2 bits from overlapping. The 2 bits of the I-axis and the 2 bits of the Q-axis may be combined to concurrently transmit 4-bit information. The $b_3$ may be a most significant bit (MSB), and the $b_0$ may be a least significant bit (LSB).

Figure 4:
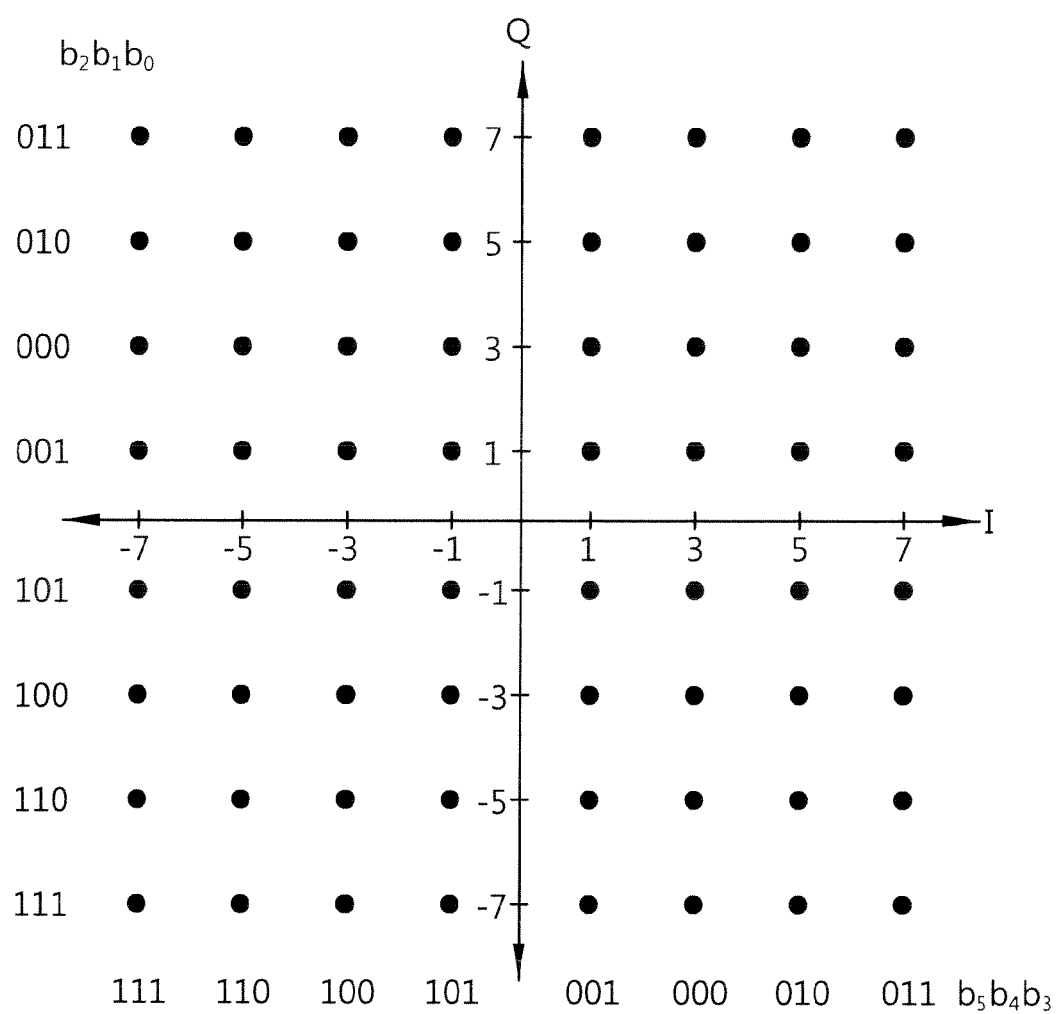
FIG. 4 shows an example of a constellation of a 64-QAM modulation scheme.

FIG. 4 shows an example of a constellation of a 64-QAM modulation scheme. Referring to FIG. 4, the constellation consists of two constitutional elements, i.e., the I-axis and the Q-axis. The I-axis consists of 3 bits of $b_5b_4b_3$, and the Q-axis consists of 3 bits of $b_2b_1b_0$. However, this is for exemplary purposes only, and the I-axis and the Q-axis can use all combinations of the constitutional elements while avoiding the respective 3 bits from overlapping. The 3 bits of the I-axis and the 3 bits of the Q-axis may be combined to concurrently transmit 6-bit information. The $b_5$ may be an MSB, and the $b_0$ may be an LSB.

Meanwhile, the constellation may be optionally rearranged. In general, the constellation rearrangement may apply to the 16-QAM or 64-QAM modulation scheme to increase a gain when HARQ is performed. The constellation rearrangement may be performed for respective bits constituting each constellation, and can be classified into horizontal mapping and vertical mapping.

The horizontal mapping differs from original mapping in that the horizontal mapping performs mapping by changing a position or value of a bit constituting the constellation. The horizontal mapping can decrease a reliability difference between coded information bits. A swapping operation and an inversion operation can be considered as an operation for the horizontal mapping. The swapping operation is used to change positions of an MSB, a significant bit (SB), and an LSB in the constellation. The inverse operation is used to inversely change a value of an information bit. That is, the inverse operation changes 1 to 0, and change 0 to 1. In the two operations above, the swapping operation can decrease a difference of per-bit error probability.

Figure 5:
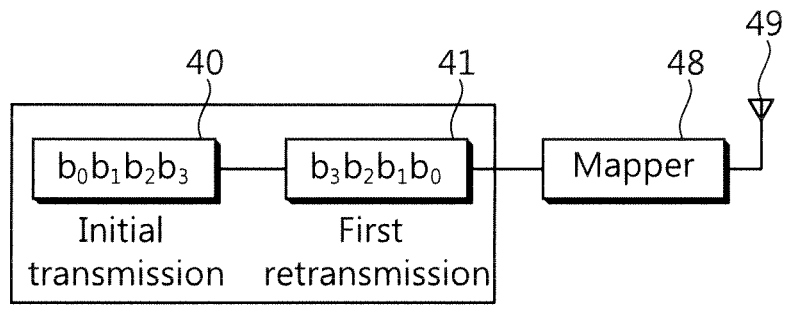
FIG. 5 shows an example of constellation rearrangement using horizontal mapping.

FIG. 5 shows an example of constellation rearrangement using horizontal mapping. Referring to FIG. 5, the 16-QAM modulation scheme may be used to transmit a data symbol through an antenna 49, and the data symbol exists on a constellation to which 4-bit information bit $\{b_0,b_1,b_2,b_3\}$ is mapped. A data symbol 40 mapped in the order of $b_0b_1b_2b_3$ is transmitted in initial transmission. $b_0$ may be an MSB, and $b_3$ may be an LSB. An error occurs in data symbols transmitted from each Tx antenna according to a channel condition, and the erroneous data symbols are retransmitted. When a retransmission request is received for the initial transmission, a data symbol 41 mapped in the order of $b_3b_2b_1b_0$ is transmitted in first retransmission. The data symbol 41 mapped in the order of $b_3b_2b_1b_0$ is obtained in such a manner that horizontal mapping is performed on the data symbol 40 mapped in the order of $b_0b_1b_2b_3$ to completely reversing the mapping order of the data symbol 40.

Figure 6:
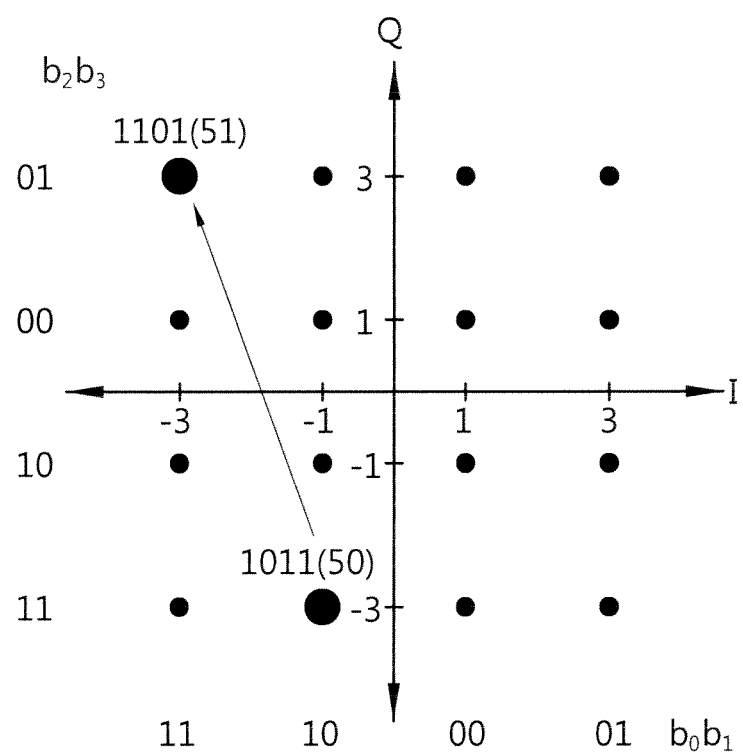
FIG. 6 shows another example of constellation rearrangement using horizontal mapping.

FIG. 6 shows another example of constellation rearrangement using horizontal mapping. The example of the horizontal mapping described with reference to FIG. 5 is expressed on a constellation in FIG. 6. A 4-bit information bit $\{b_0,b_1,b_2,b_3\}$ has a value of $\{1,0,1,1\}$, respectively. Referring to FIG. 6, a data symbol '1011' 50 mapped in the order of $b_0b_1b_2b_3$ is transmitted in initial transmission. When a retransmission request is received for the initial transmission, a data symbol '1101' 51 mapped in the order of $b_3b_2b_1b_0$ is transmitted in first retransmission.

Meanwhile, vertical mapping implies that mapping is performed by changing a mapping position between two or more data symbols when the two or more data symbols exist in one tone. Since two or more data symbols exist, it implies that the number of input streams of a precoder, that is, a rank is 2 or higher. The vertical mapping may be used to average a channel state difference between initial transmission and retransmission.

Figure 7:
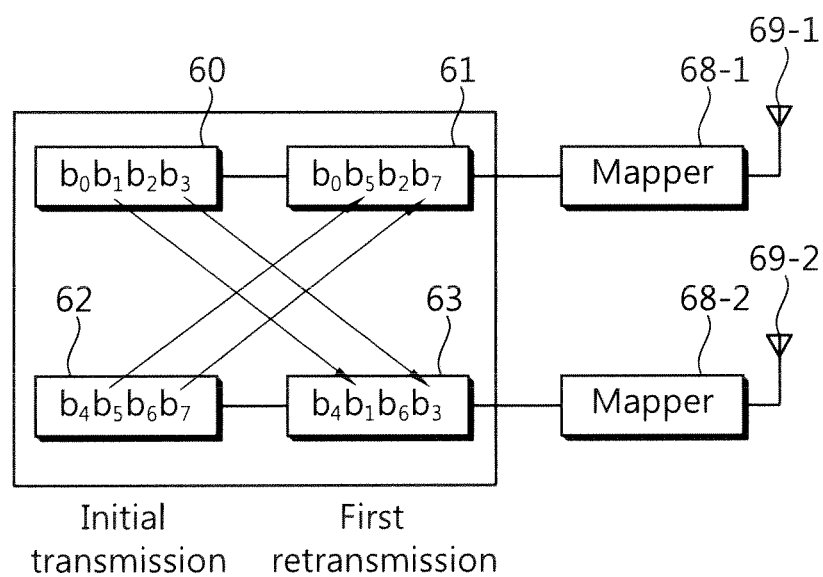
FIG. 7 shows an example of constellation rearrangement using vertical mapping.

FIG. 7 shows an example of constellation rearrangement using vertical mapping.

Referring to FIG. 7, data symbols are transmitted through respective antennas. The 16-QAM modulation scheme may be used to transmit data symbols through antennas 69-1 and 69-2, and the data symbols exist on a constellation to which 4-bit information bits $\{b_0,b_1,b_2,b_3\}$ and $\{b_4,b_5,b_6,b_7\}$ are mapped. A data symbol 60 mapped in the order of $b_0b_1b_2b_3$ and a data symbol 61 mapped in the order of $b_4b_5b_6b_7$ are transmitted in initial transmission. $b_0$ and $b_4$ may be an MSB. $b_3$ and $b_7$ may be an LSB. When a retransmission request is received for a signal of the initial transmission, a data symbol 62 mapped in the order of $b_0b_5b_2b_7$ and a data symbol 63 mapped in the order of $b_4b_1b_6b_3$ are transmitted in first retransmission. The data symbol 62 mapped in the order of $b_0b_5b_2b_7$ and the data symbol 63 mapped in the order of $b_4b_1b_6b_3$ are obtained in such a manner that vertical mapping is performed on the data symbol 60 mapped in the order of $b_0b_1b_2b_3$ and the data symbol 61 mapped in the order of $b_4b_5b_6b_7$ so that bits $b_1$ and $b_5$ mapped in a second position in each data symbol and bits $b_3$ and $b_7$ mapped in a fourth position in each data symbol swap their positions between the data symbols.

Hereinafter, the proposed method of performing HARQ will be described according to an embodiment of the present invention.

Figure 8:
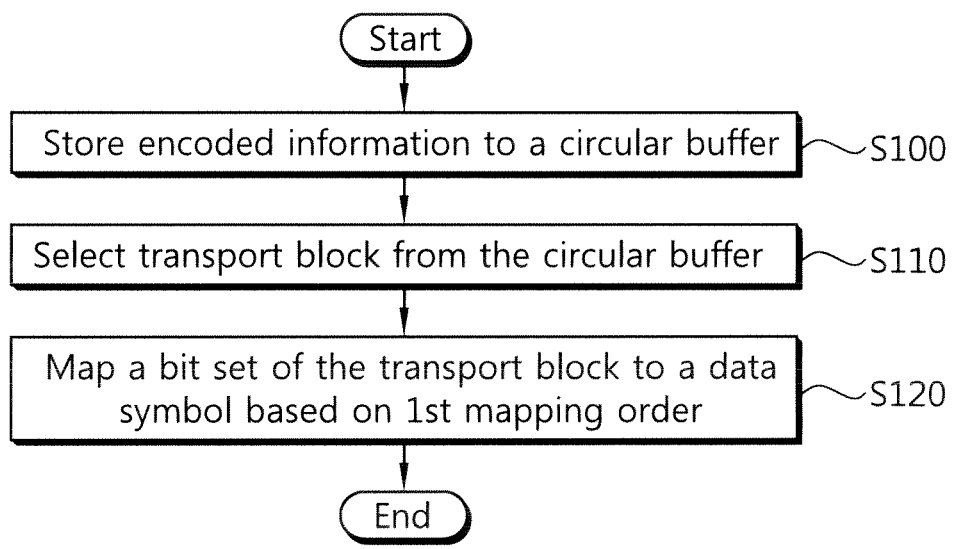
FIG. 8 is a flowchart showing an embodiment of the proposed method of performing hybrid automatic repeat request (HARQ).

FIG. 8 is a flowchart showing an embodiment of the proposed method of performing HARQ.

In step S100, a transmitter stores an encoded information bit into a circular buffer.

In step S110, the transmitter selects a transport block from the circular buffer. The transport block may be a part or the entirety of the information bit stored in the circular buffer.

In step S120, the transmitter maps a bit set including n bits of the transport block to a data symbol on a constellation for $2^n$-QAM modulation according to a first mapping order.

When bits of the transport block are subject to wrap-around at the end of the circular buffer, the transmitter maps the bit set according to a second mapping order. The wrap-around implies that the bits of the transport block return to the front of the circular buffer from the end of the circular buffer.

Changing of the mapping order implies constellation rearrangement. Rearrangement of constitutional bits on the constellation may be performed by using interleaving, and then rearrangement may be performed among constitutional bits of a spatial data stream. On the contrary, rearrangement may be performed among the constitutional bits of the spatial data stream and then rearrangement of the constitutional bits on the constellation may be performed. The rearrangement of the constitutional bits on the constellation may be horizontal mapping. The rearrangement among the constitutional bits of the spatial data stream may be vertical mapping. The interleaving may include the swapping operation and the inverse operation of the horizontal mapping, and may include the vertical mapping.

The transmitter can additionally transmit a constellation rearrangement version (CRV) when changing the mapping order or when performing constellation rearrangement. The CRV is a numerical expression of a specific mapping order determined according to the number of ranks and a modulation scheme. Therefore, the CRV may be one-to-one mapped to a part of a rearrangement pattern that can be used for bits constituting a retransmission symbol. In addition, when the bits of the transport block are subject to wrap-around at the end of the circular buffer, the CRV is modified along with a change of a mapping order.

The CRV is important information when performing HARQ, and thus needs to be known both to a BS and a UE. In case of downlink HARQ, the transmitter transmits a starting value of the CRV with respect to each sub-packet. In case of uplink HARQ, the BS and the UE can implicitly know information on the CRV. In this case, for each transmission symbol, the CRV may be predetermined by the number of symbol transmissions.

Table 1 shows an example of a mapping rule according to a CRV in a system with a rank 1 when using the 16-QAM modulation scheme. Horizontal mapping is applied in this example.

TABLE 1

| CoRe version | Mapping rule |
| --- | --- |
| 1 | $b_0b_1b_2b_3$ |
| 2 | $b_1b_0b_3b_2$ |
| 3 | $b_0\bar{b}_1b_2\bar{b}_3$ |
| 4 | $\bar{b}_0b_1\bar{b}_2b_3$ |
| 5 | $b_1\bar{b}_0b_3\bar{b}_2$ |
| 6 | $\bar{b}_1b_0\bar{b}_3b_2$ |
| 7 | $\bar{b}_0\bar{b}_1\bar{b}_2\bar{b}_3$ |
| 8 | $\bar{b}_1\bar{b}_0\bar{b}_3\bar{b}_2$ |

In Table 1 above, $b_0$ denotes an MSB on the I-axis, $b_1$ denotes an LSB on the I-axis, $b_2$ denotes an MSB on the Q-axis, and $b_3$ denotes an LSB on the Q-axis. The overline ( ) denotes an inverse operation of a specific bit. A retransmission symbol can be selected from any one of the CRVs above, and an order of bits constituting the symbol can be changed.

Table 2 shows an example of a mapping rule according to a CRV in a system with a rank 1 when using the 64-QAM modulation scheme. Horizontal mapping is applied in this example.

TABLE 2

| CoRe version | Mapping rule |
|---|---|
| 1 | $b_0 b_1 b_2 b_3 b_4 b_5$ |
| 2 | $b_0 b_2 b_1 b_3 b_5 b_4$ |
| 3 | $b_1 b_0 b_2 b_4 b_3 b_5$ |
| 4 | $b_1 b_2 b_0 b_4 b_5 b_3$ |
| 5 | $b_2 b_1 b_0 b_5 b_4 b_3$ |
| 6 | $b_2 b_0 b_1 b_5 b_3 b_4$ |
| 7 | $\bar{b}_0 b_1 b_2 \bar{b}_3 b_4 b_5$ |
| 8 | $\bar{b}_0 b_1 b_2 b_3 b_4 b_5$ |
| 9 | $b_0 \bar{b}_1 b_2 b_3 \bar{b}_4 b_5$ |
| 10 | $b_0 b_1 \bar{b}_2 b_3 b_4 \bar{b}_5$ |
| 11 | $\bar{b}_0 b_2 b_1 \bar{b}_3 b_5 b_4$ |
| 12 | $b_0 \bar{b}_2 b_1 b_3 \bar{b}_5 b_4$ |
| 13 | $b_0 \bar{b}_2 \bar{b}_1 b_3 b_5 \bar{b}_4$ |
| 14 | $\bar{b}_1 b_0 b_2 \bar{b}_4 b_3 b_5$ |
| 15 | $b_1 \bar{b}_0 b_2 b_4 \bar{b}_3 b_5$ |
| 16 | $b_1 b_0 \bar{b}_2 b_4 b_3 \bar{b}_5$ |
| 17 | $\bar{b}_1 b_2 b_0 \bar{b}_4 b_5 b_3$ |
| 18 | $b_1 \bar{b}_2 b_0 b_4 \bar{b}_5 b_3$ |
| 19 | $b_1 b_2 \bar{b}_0 b_4 b_5 \bar{b}_3$ |
| 20 | $\bar{b}_2 b_1 b_0 \bar{b}_5 b_4 b_3$ |
| 21 | $b_2 \bar{b}_1 b_0 b_5 \bar{b}_4 b_3$ |
| 22 | $b_2 b_1 \bar{b}_0 b_5 b_4 \bar{b}_3$ |
| 23 | $\bar{b}_2 b_0 b_1 \bar{b}_5 b_3 b_4$ |
| 24 | $b_2 \bar{b}_0 b_1 b_5 \bar{b}_3 b_4$ |
| 25 | $b_2 b_0 \bar{b}_1 b_5 b_3 \bar{b}_4$ |
| 26 | $\bar{b}_0 \bar{b}_1 b_2 \bar{b}_3 \bar{b}_4 b_5$ |
| 27 | $\bar{b}_0 b_1 \bar{b}_2 \bar{b}_3 b_4 \bar{b}_5$ |
| 28 | $b_0 \bar{b}_1 \bar{b}_2 b_3 \bar{b}_4 \bar{b}_5$ |
| 29 | $\bar{b}_0 \bar{b}_2 b_1 \bar{b}_3 \bar{b}_5 b_4$ |
| 30 | $\bar{b}_0 b_2 \bar{b}_1 \bar{b}_3 b_5 \bar{b}_4$ |
| 31 | $b_0 \bar{b}_2 \bar{b}_1 b_3 \bar{b}_5 \bar{b}_4$ |
| 32 | $\bar{b}_1 \bar{b}_0 b_2 \bar{b}_4 \bar{b}_3 b_5$ |
| 33 | $\bar{b}_1 b_0 \bar{b}_2 \bar{b}_4 b_3 \bar{b}_5$ |
| 34 | $b_1 \bar{b}_0 \bar{b}_2 b_4 \bar{b}_3 \bar{b}_5$ |
| 36 | $\bar{b}_1 \bar{b}_2 b_0 \bar{b}_4 \bar{b}_5 b_3$ |
| 37 | $\bar{b}_1 b_2 \bar{b}_0 \bar{b}_4 b_5 \bar{b}_3$ |
| 38 | $b_1 \bar{b}_2 \bar{b}_0 b_4 \bar{b}_5 \bar{b}_3$ |
| 39 | $\bar{b}_2 \bar{b}_1 b_0 \bar{b}_5 \bar{b}_4 b_3$ |
| 40 | $\bar{b}_2 b_1 \bar{b}_0 \bar{b}_5 b_4 \bar{b}_3$ |
| 41 | $b_2 \bar{b}_1 \bar{b}_0 b_5 \bar{b}_4 \bar{b}_3$ |
| 42 | $\bar{b}_2 \bar{b}_0 b_1 \bar{b}_5 \bar{b}_3 b_4$ |
| 43 | $\bar{b}_2 b_0 \bar{b}_1 \bar{b}_5 b_3 \bar{b}_4$ |
| 44 | $b_2 \bar{b}_0 \bar{b}_1 b_5 \bar{b}_3 \bar{b}_4$ |
| 45 | $\bar{b}_2 \bar{b}_0 \bar{b}_1 \bar{b}_5 \bar{b}_3 \bar{b}_4$ |
| 46 | $\bar{b}_2 b_0 \bar{b}_1 \bar{b}_5 b_3 \bar{b}_4$ |
| 47 | $b_2 \bar{b}_0 \bar{b}_1 b_5 \bar{b}_3 \bar{b}_4$ |
| 48 | $b_2 \bar{b}_0 \bar{b}_1 b_5 \bar{b}_3 \bar{b}_4$ |
| 49 | $b_0 b_2 \bar{b}_1 b_3 b_5 \bar{b}_4$ |
| 50 | $\bar{b}_1 \bar{b}_0 \bar{b}_2 \bar{b}_4 b_3 b_5$ |
| 51 | $\bar{b}_1 \bar{b}_2 \bar{b}_0 \bar{b}_4 \bar{b}_5 b_3$ |
| 52 | $\bar{b}_2 \bar{b}_1 \bar{b}_0 \bar{b}_5 b_4 \bar{b}_3$ |
| 53 | $\bar{b}_2 \bar{b}_0 \bar{b}_1 \bar{b}_5 b_3 \bar{b}_4$ |

In Table 2 above, $b_0$ denotes an MSB on the I-axis, $b_1$ denotes an SB on the I-axis, $b_2$ denotes an LSB on the I-axis, $b_3$ denotes an MSB on the Q-axis, $b_4$ denotes an SB on the Q-axis, and $b_5$ denotes an LSB on the Q-axis. The overline ( ¯ ) denotes an inverse operation of a specific bit. A retransmission symbol can be selected from any one of the CRVs above, and an order of bits constituting the symbol can be changed.

Table 3 shows an example of a mapping rule according to a CRV in a system with a rank 2 when using the 16-QAM modulation scheme. Vertical mapping is applied in this example. The vertical mapping may be included in the horizontal mapping in the CRV. Irrespective of the horizontal mapping, a spatial diversity can be obtained by using the same mapping rule in every transmission.

TABLE 3

| CoRe version | Mapping rule | |
|---|---|---|
| 0 | $b_0 b_1 b_2 b_3$ | $b_4 b_5 b_6 b_7$ |
| 1 | $b_4 b_1 b_2 b_3$ | $b_0 b_5 b_6 b_7$ |
| 2 | $b_0 b_1 b_6 b_3$ | $b_4 b_5 b_2 b_7$ |
| 3 | $b_0 b_5 b_2 b_3$ | $b_4 b_1 b_6 b_7$ |
| 4 | $b_0 b_1 b_2 b_7$ | $b_4 b_5 b_6 b_3$ |
| 5 | $b_4 b_5 b_2 b_3$ | $b_0 b_1 b_6 b_7$ |
| 6 | $b_0 b_1 b_6 b_7$ | $b_4 b_5 b_2 b_3$ |
| 7 | $b_4 b_1 b_6 b_3$ | $b_0 b_5 b_2 b_7$ |
| 8 | $b_0 b_5 b_2 b_7$ | $b_4 b_1 b_6 b_3$ |
| 9 | $b_4 b_1 b_2 b_7$ | $b_0 b_5 b_6 b_3$ |
| 10 | $b_0 b_5 b_6 b_3$ | $b_4 b_1 b_2 b_7$ |
| 11 | $b_4 b_5 b_6 b_3$ | $b_0 b_1 b_2 b_7$ |
| 12 | $b_4 b_5 b_2 b_7$ | $b_0 b_1 b_6 b_3$ |
| 13 | $b_4 b_1 b_6 b_7$ | $b_0 b_5 b_2 b_3$ |
| 14 | $b_0 b_5 b_6 b_7$ | $b_4 b_1 b_2 b_3$ |
| 15 | $b_4 b_5 b_6 b_7$ | $b_0 b_1 b_2 b_3$ |

In Table 3 above, a first column may denote 16-QAM mapping for a symbol belonging to a first spatial stream of two spatial streams, and a second column may denote 16-QAM mapping for a symbol belonging to a second spatial stream thereof. MSB and LSB orders of the second symbol follow MSB and LSB orders of the first symbol.

Table 4 shows an example of a mapping rule according to a CRV in a system with a rank 2 when using the 64-QAM modulation scheme. Vertical mapping is applied in this example. The vertical mapping may be included in the horizontal mapping in the CRV. Irrespective of the horizontal mapping, a spatial diversity can be obtained by using the same mapping rule in every transmission.

TABLE 4

| CoRe version | Mapping rule | |
|---|---|---|
| 0 | $b_0 b_1 b_2 b_3 b_4 b_5$ | $b_6 b_7 b_8 b_9 b_{10} b_{11}$ |
| 1 | $b_0 b_1 b_2 b_3 b_4 b_5$ | $b_0 b_7 b_8 b_9 b_{10} b_{11}$ |
| 2 | $b_0 b_7 b_2 b_3 b_4 b_5$ | $b_6 b_1 b_8 b_9 b_{10} b_{11}$ |
| 3 | $b_0 b_1 b_8 b_3 b_4 b_5$ | $b_6 b_7 b_2 b_9 b_{10} b_{11}$ |
| 4 | $b_0 b_1 b_2 b_9 b_4 b_5$ | $b_6 b_7 b_8 b_3 b_{10} b_{11}$ |
| 5 | $b_0 b_1 b_2 b_3 b_{10} b_5$ | $b_6 b_7 b_8 b_9 b_4 b_{11}$ |
| 6 | $b_0 b_1 b_2 b_3 b_4 b_{11}$ | $b_6 b_7 b_8 b_9 b_{10} b_5$ |
| 7 | $b_6 b_1 b_2 b_9 b_4 b_5$ | $b_0 b_7 b_8 b_3 b_{10} b_{11}$ |
| 8 | $b_0 b_7 b_2 b_3 b_{10} b_5$ | $b_6 b_1 b_8 b_9 b_4 b_{11}$ |
| 9 | $b_0 b_1 b_8 b_3 b_4 b_{11}$ | $b_6 b_7 b_2 b_9 b_{10} b_5$ |
| 10 | $b_6 b_7 b_2 b_3 b_4 b_5$ | $b_0 b_1 b_8 b_9 b_{10} b_{11}$ |
| 11 | $b_6 b_1 b_8 b_3 b_4 b_5$ | $b_0 b_7 b_2 b_9 b_{10} b_{11}$ |
| 12 | $b_0 b_7 b_8 b_3 b_4 b_5$ | $b_6 b_1 b_2 b_9 b_{10} b_{11}$ |
| 13 | $b_0 b_1 b_2 b_9 b_{10} b_5$ | $b_6 b_7 b_8 b_3 b_4 b_{11}$ |
| 14 | $b_0 b_1 b_2 b_9 b_4 b_{11}$ | $b_6 b_7 b_8 b_3 b_{10} b_5$ |
| 15 | $b_0 b_1 b_2 b_3 b_{10} b_{11}$ | $b_6 b_7 b_8 b_9 b_4 b_5$ |
| 16 | $b_6 b_7 b_8 b_3 b_4 b_5$ | $b_0 b_1 b_2 b_9 b_{10} b_{11}$ |
| 17 | $b_0 b_1 b_2 b_9 b_{10} b_{11}$ | $b_6 b_7 b_8 b_3 b_4 b_5$ |
| 18 | $b_6 b_1 b_8 b_9 b_4 b_5$ | $b_0 b_7 b_2 b_3 b_{10} b_{11}$ |
| 19 | $b_6 b_1 b_2 b_9 b_4 b_{11}$ | $b_0 b_7 b_8 b_3 b_{10} b_5$ |
| 20 | $b_6 b_7 b_2 b_9 b_4 b_5$ | $b_0 b_1 b_8 b_3 b_{10} b_{11}$ |
| 21 | $b_6 b_1 b_2 b_9 b_{10} b_5$ | $b_0 b_7 b_8 b_3 b_4 b_{11}$ |
| 22 | $b_0 b_7 b_8 b_9 b_4 b_5$ | $b_6 b_1 b_2 b_3 b_{10} b_{11}$ |
| 23 | $b_6 b_1 b_2 b_3 b_{10} b_{11}$ | $b_0 b_7 b_8 b_9 b_4 b_5$ |
| 24 | $b_6 b_7 b_2 b_3 b_{10} b_5$ | $b_0 b_1 b_8 b_9 b_4 b_{11}$ |
| 25 | $b_0 b_7 b_2 b_9 b_{10} b_5$ | $b_6 b_1 b_8 b_3 b_4 b_{11}$ |
| 26 | $b_6 b_1 b_8 b_9 b_4 b_5$ | $b_0 b_7 b_2 b_3 b_{10} b_{11}$ |
| 27 | $b_0 b_7 b_2 b_9 b_4 b_{11}$ | $b_6 b_1 b_8 b_3 b_{10} b_5$ |
| 28 | $b_0 b_7 b_8 b_3 b_{10} b_5$ | $b_6 b_1 b_2 b_9 b_4 b_{11}$ |
| 29 | $b_0 b_7 b_2 b_3 b_{10} b_{11}$ | $b_6 b_1 b_8 b_9 b_4 b_5$ |
| 30 | $b_6 b_1 b_8 b_3 b_4 b_{11}$ | $b_0 b_7 b_2 b_9 b_{10} b_5$ |
| 31 | $b_0 b_1 b_8 b_9 b_4 b_{11}$ | $b_6 b_7 b_2 b_3 b_{10} b_5$ |
| 32 | $b_6 b_7 b_2 b_3 b_4 b_{11}$ | $b_0 b_1 b_8 b_9 b_{10} b_5$ |
| 33 | $b_0 b_1 b_8 b_9 b_{10} b_5$ | $b_6 b_7 b_2 b_3 b_4 b_{11}$ |
| 34 | $b_0 b_7 b_8 b_3 b_4 b_{11}$ | $b_6 b_1 b_2 b_9 b_{10} b_5$ |
| 35 | $b_0 b_1 b_8 b_3 b_{10} b_{11}$ | $b_6 b_7 b_2 b_9 b_4 b_5$ |
| 36 | $b_6 b_7 b_8 b_9 b_4 b_5$ | $b_0 b_1 b_2 b_3 b_{10} b_{11}$ |
| 37 | $b_6 b_1 b_2 b_9 b_{10} b_{11}$ | $b_0 b_7 b_8 b_3 b_4 b_5$ |
| 38 | $b_0 b_7 b_2 b_9 b_{10} b_{11}$ | $b_6 b_1 b_8 b_3 b_4 b_5$ |
| 39 | $b_6 b_7 b_8 b_3 b_{10} b_5$ | $b_0 b_1 b_2 b_9 b_4 b_{11}$ |

TABLE 4-continued

| CoRe version | Mapping rule | |
|---|---|---|
| 40 | $b_0b_1b_8b_9b_{10}b_{11}$ | $b_6b_7b_2b_3b_4b_5$ |
| 41 | $b_6b_7b_8b_3b_4b_{11}$ | $b_0b_1b_2b_9b_{10}b_5$ |
| 42 | $b_6b_7b_2b_9b_{10}b_5$ | $b_0b_1b_8b_3b_4b_{11}$ |
| 43 | $b_6b_7b_2b_9b_4b_{11}$ | $b_0b_1b_8b_3b_{10}b_5$ |
| 44 | $b_6b_7b_2b_3b_{10}b_{11}$ | $b_0b_1b_8b_9b_4b_5$ |
| 45 | $b_6b_1b_8b_9b_{10}b_5$ | $b_0b_7b_2b_3b_4b_{11}$ |
| 46 | $b_6b_1b_8b_9b_4b_{10}$ | $b_0b_7b_2b_3b_{10}b_5$ |
| 47 | $b_6b_1b_8b_3b_{10}b_{11}$ | $b_0b_7b_2b_9b_4b_5$ |
| 48 | $b_0b_7b_8b_9b_{10}b_5$ | $b_6b_1b_2b_3b_4b_{11}$ |
| 49 | $b_0b_7b_8b_9b_4b_{11}$ | $b_6b_1b_2b_3b_{10}b_5$ |
| 50 | $b_0b_7b_8b_3b_{10}b_{11}$ | $b_6b_1b_2b_9b_4b_5$ |
| 51 | $b_6b_7b_8b_9b_{10}b_5$ | $b_0b_1b_2b_3b_4b_{11}$ |
| 52 | $b_6b_7b_8b_9b_4b_{11}$ | $b_0b_1b_2b_3b_{10}b_5$ |
| 53 | $b_6b_7b_8b_3b_{10}b_{11}$ | $b_0b_1b_2b_9b_4b_5$ |
| 54 | $b_6b_7b_2b_9b_{10}b_{11}$ | $b_0b_1b_8b_3b_4b_5$ |
| 55 | $b_6b_1b_8b_9b_{10}b_{11}$ | $b_0b_7b_2b_3b_4b_5$ |
| 56 | $b_0b_7b_8b_9b_{10}b_{11}$ | $b_6b_1b_2b_3b_4b_5$ |
| 57 | $b_6b_7b_8b_9b_{10}b_{11}$ | $b_0b_1b_2b_3b_4b_5$ |

In Table 4 above, a first column may denote 64-QAM mapping for a symbol belonging to a first spatial stream of two spatial streams, and a second column may denote 64-QAM mapping for a symbol belonging to a second spatial stream thereof. MSB and LSB orders of the second symbol follow MSB and LSB orders of the first symbol.

The mapping rules of Table 1 to Table 4 above are designed in terms of an average performance gain in maximum retransmission. In addition, the mapping rules of Table 1 to Table 4 above are designed to achieve relatively low implementation complexity. The mapping rules of Table 1 to Table 4 above can be applied in initial transmission. In this case, bit reliability of convolution turbo code (CTC) bit grouping can be diversified.

When the horizontal mapping or vertical mapping is applied, an operation applied to the I-axis and an operation applied to the Q-axis can be changed to each other. That is, the operation applied to the I-axis is equivalent to that applied to the Q-axis. For example, when the horizontal mapping or vertical mapping is applied to an MSB and an SB on the I-axis and to an SB on the Q-axis, this is identical to a case where a corresponding operation is applied to the SB on the I-axis and to the MSB and the SB on the Q-axis.

In addition, constellation rearrangement can be performed by combining the proposed mapping rules. That is, when using the 16-QAM modulation scheme, the horizontal mapping of Table 1 and the vertical mapping of Table 3 can be combined to construct a new mapping rule, and when using the 64-QAM modulation scheme, the horizontal mapping of Table 2 and the vertical mapping of Table 4 can be combined to construct a new mapping rule.

For example, the mapping rule corresponding to the CRV 2 of Table 1 and the mapping rule corresponding to the CRV 7 of Table 3 can be combined to construct a new mapping rule, i.e., CRV x. Subscripts 1, 0, 3, and 2 in the CRV 2 of Table 1 denote indices indicating bits in each symbol before rearrangement, and thus the indices denote horizontal mapping patterns. That is, vertical mapping is performed on a first symbol and a second symbol by applying a mapping rule corresponding to the CRV 7 of Table 3, and then a mapping rule corresponding to the CRV 7 of Table 1 can be applied thereto. In this case, the first symbol is mapped to $b_1b_4b_3b_6$, and the second symbol is mapped to $b_5b_0b_7b_2$. Although two symbols exist in the above example, the vertical mapping of the same concept can apply even when three or more symbols exist.

Hereinafter, examples of a new mapping rule constructed by combining horizontal mapping and vertical mapping will be described. In the following examples, an MSB and an LSB change (or swap) their positions in the I-axis and in the Q-axis by using horizontal mapping prior to vertical mapping.

In case of using the 16-QAM modulation scheme

1) When an MSB on the I-axis and an LSB on the Q-axis are swapped between two symbols by using vertical mapping, $b_5b_0b_3b_6$ can be obtained as a first symbol, and $b_1b_4b_7b_2$ can be obtained as a second symbol.

2) When an LSB on the I-axis and an MSB on the Q-axis are swapped between two symbols by using vertical mapping, $b_1b_4b_7b_2$ can be obtained as a first symbol, and $b_5b_0b_3b_6$ can be obtained as a second symbol.

3) When an LSB on the I-axis and an LSB on the Q-axis are swapped between two symbols by using vertical mapping, $b_1b_4b_3b_6$ can be obtained as a first symbol, and $b_5b_0b_7b_2$ can be obtained as a second symbol.

4) When an MSB on the I-axis and an MSB on the Q-axis are swapped between two symbols by using vertical mapping, $b_5b_0b_7b_2$ can be obtained as a first symbol, and $b_1b_4b_3b_6$ can be obtained as a second symbol.

5) When all bits on the I-axis and the Q-axis are swapped between two symbols by using vertical mapping, $b_5b_4b_7b_6$ can be obtained as a first symbol, and $b_1b_0b_3b_2$ can be obtained as a second symbol.

In case of using the 64-QAM modulation scheme

1) When an MSB and an LSB on the I-axis and an SB on the Q-axis are swapped between two symbols by using vertical mapping, $b_8b_1b_6b_5b_{10}b_3$ can be obtained as a first symbol, and $b_2b_7b_0b_1 b_4b_9$ can be obtained as a second symbol.

2) When an MSB and an LSB on the I-axis and an MSB on the Q-axis are swapped between two symbols by using vertical mapping, $b_8b_1b_6b_{11}b_4b_3$ can be obtained as a first symbol, and $b_2b_7b_0b_5b_{10}b_9$ can be obtained as a second symbol.

3) When an SB of on the I-axis and an SB on the Q-axis are swapped between two symbols by using vertical mapping, $b_2b_7b_0b_5b_{10}b_3$ can be obtained as a first symbol, and $b_8b_1b_6b_{11}b_4b_9$ can be obtained as a second symbol.

4) When an MSB on the I-axis and an MSB on the Q-axis are swapped between two symbols by using vertical mapping, $b_8b_1b_0b_{11}b_4b_3$ can be obtained as a first symbol, and $b_2b_7b_6b_5b_{10}b_9$ can be obtained as a second symbol.

5) When all bits on the I-axis and the Q-axis are swapped between two symbols by using vertical mapping, $b_8b_7b_6b_{11}b_{10}b_9$ can be obtained as a first symbol, and $b_2b_1b_0b_5b_4b_3$ can be obtained as a second symbol.

When a retransmission symbol is transmitted, each of bits constituting the retransmission symbol can be remapped by applying the various mapping rules above. According to the number of retransmissions, N mapping rules can be selected and used. A criterion of selecting the mapping rule can be selected such that an HARQ gain can be obtained to the maximum extent possible, or can be selected such that an overhead imposed on a system can be minimized in terms of implementations. If a CRV is 1 bit, two mapping rules may exist, and thus the two mapping rules can be applied to the retransmission symbol. Mapping rules corresponding to the CRV 0 and the CRV 1 may be alternately applied according to retransmission, or a mapping rule corresponding to a specific CRV may be continuously applied. If the CRV is 2 bits, four mapping rules may exist, and in this case, the four mapping rules can be selected to be applied to the retransmission symbol. If a maximum transmission number is 4, a different CRV construction may be applied in every transmission including initial transmission. In general, if the CRV is N bits, $2^N$ mapping rules may exist.

Figure 9:
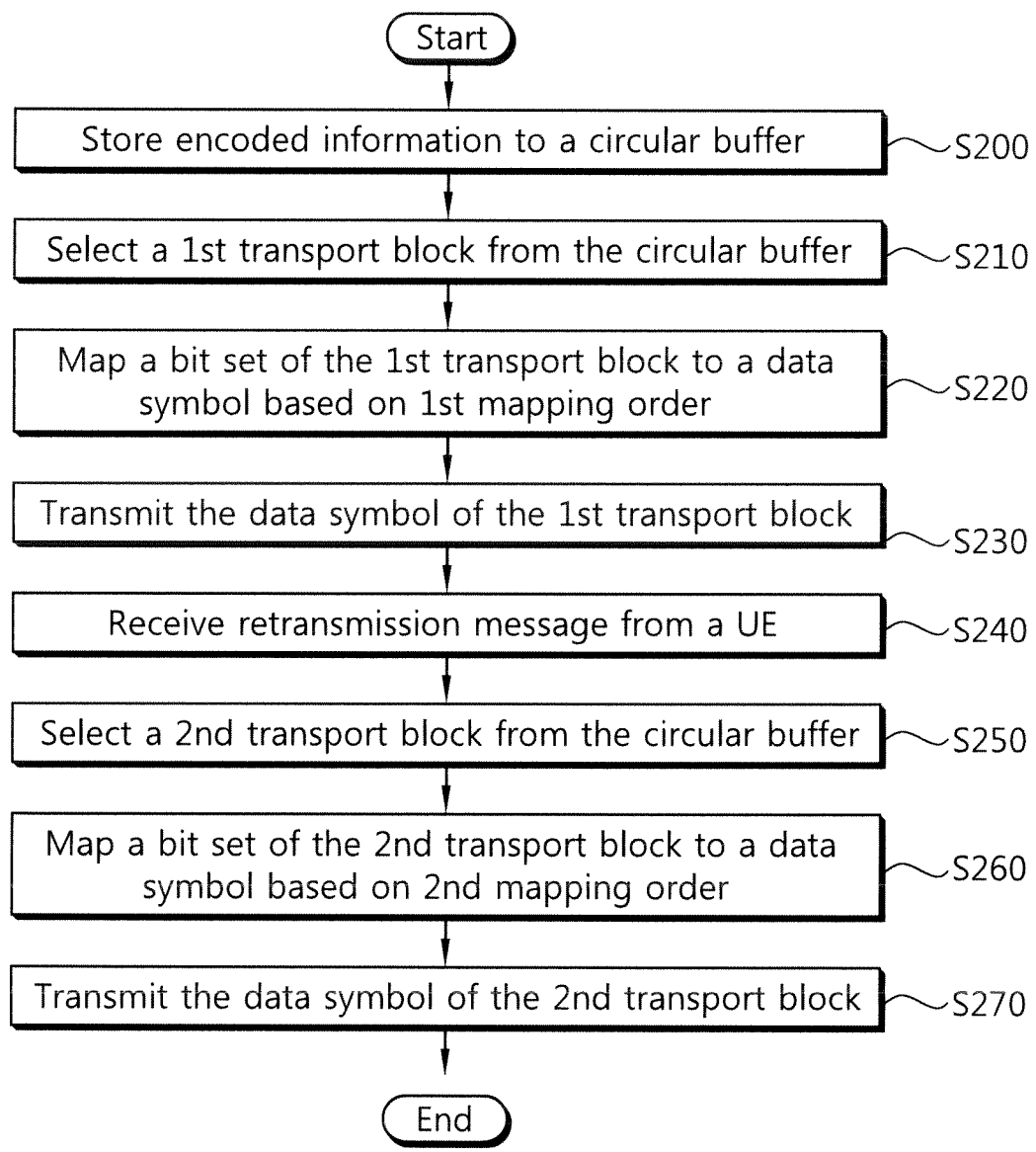
FIG. 9 is a flowchart showing another embodiment of the proposed method of performing HARQ.

FIG. 9 is a flowchart showing another embodiment of the proposed method of performing HARQ.

Referring to FIG. 9, in step S200, a transmitter stores an encoded information bit into a circular buffer.

In step S210, the transmitter selects a first transport block from the circular buffer.

In step S220, the transmitter maps a bit set including n bits of the first transport block to a data symbol on a constellation for $2^n$-QAM modulation according to a first mapping order.

In step S230, the transmitter transmits the data symbol of the first transport block.

In step S240, the transmitter receives a retransmission request for the information bit.

In step S250, the transmitter selects a second transport block for retransmission of the information bit from the circular buffer.

In step S260, the transmitter maps a bit set including n bits of the second transport block to a data symbol on a constellation for $2^n$-QAM modulation. In this case, when the n bits of the second transport block are subject to wrap-around at the end of the circular buffer, the n bits can be mapped according to a second mapping order.

In step S270, the transmitter transmits the data symbol of the second transport block.

Figure 10:
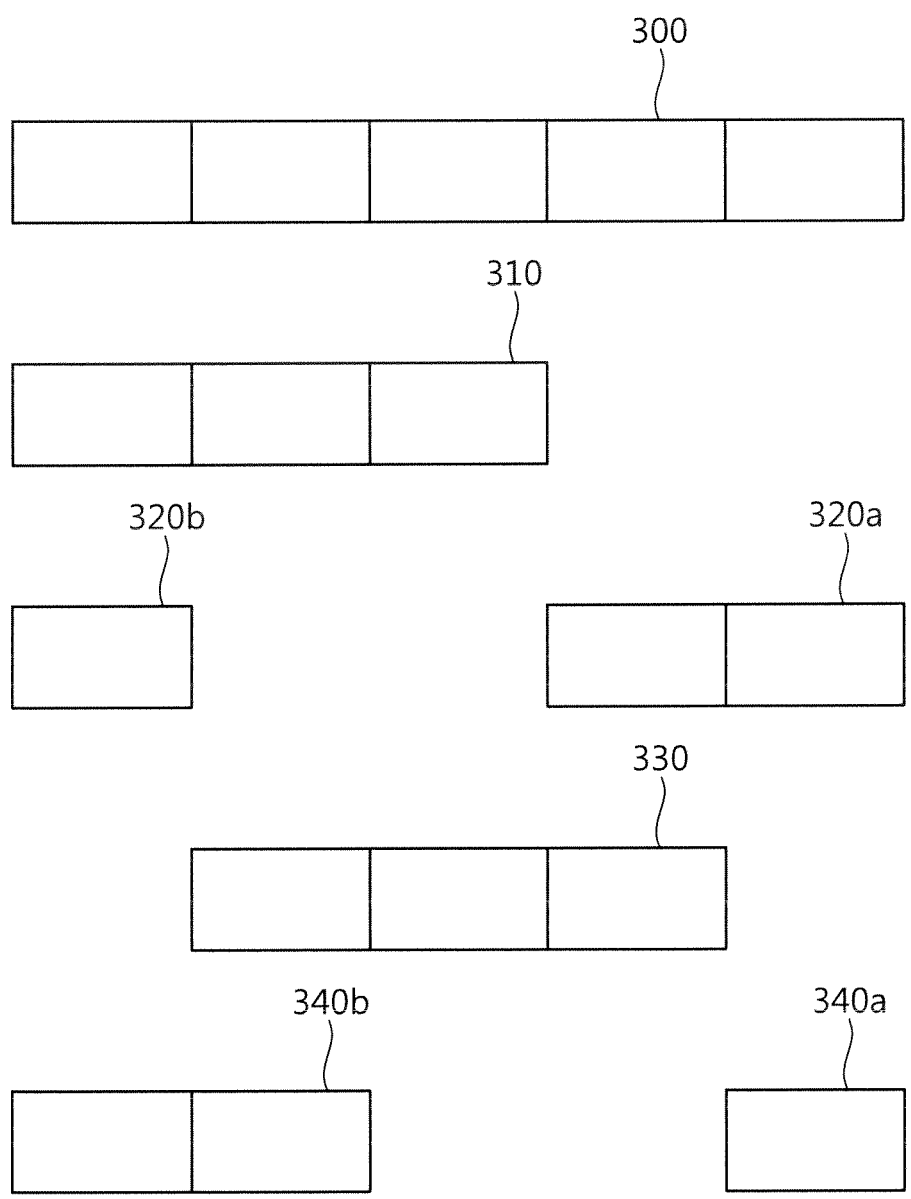
FIG. 10 shows an example of an operation of a circular buffer according to the proposed method of performing HARQ.

FIG. 10 shows an example of an operation of a circular buffer according to the proposed method of performing HARQ.

A circular buffer 300 stores a code block. An initial transport block 310 which is a part of the code block is transmitted. A CRV of the initial transport block 310 may be 0. According to a retransmission request, first retransmission is performed and a first retransmission block 320 consecutive to the initial transport block is transmitted. The first retransmission block 320 can be divided into a non-overlapping block 320*a* not overlapping with the initial transport block 310 and an overlapping block 320*b* overlapping with the initial transport block 310. In this case, the CRV can be changed to 1 in the overlapping block 320*b* transmitted in a front portion of the circular buffer. In second retransmission, a second retransmission block 330 consecutive to the first retransmission block 320 is transmitted. In third retransmission, a third retransmission block 340 consecutive to the second retransmission block 330 is transmitted. The third retransmission block 340 can be divided into a first-time overlapping block 340*a* and a second-time overlapping block 340*b*. The first-time overlapping block is a block transmitted one time in previous transmissions. The second-time overlapping block is a block transmitted twice in previous transmissions. The CRV can be changed back to 0 in the two-time overlapping block 340*b* in a first portion of the circular buffer.

Hereinafter, improvement of HARQ performance will be described when using the proposed method of performing HARQ.

Figure 11:
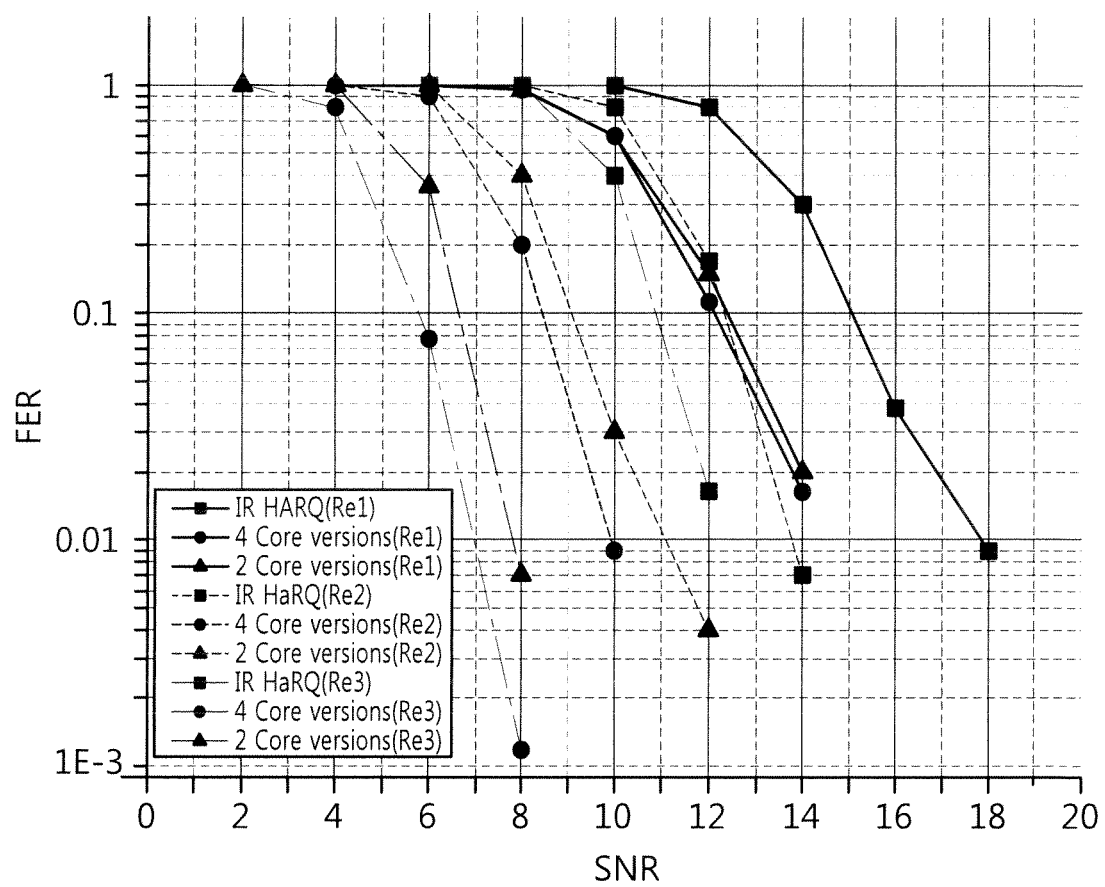
FIG. 11 is a graph showing a performance difference depending on the number of constellation rearrangement versions (CRVs) when HARQ is performed based on increment redundancy (IR) HARQ.

FIG. 11 is a graph showing a performance difference depending on the number of CRVs when HARQ is performed based on IR HARQ. The performance of HARQ can be known according to a relation between a signal-to-noise ratio (SNR) and a frame error rate (FER). 64 QAM is used as a modulation scheme, and a ½ CTC is used. Referring to FIG. 11, as the number of CRVs increases to 2 and 4, the FER against the SNR decreases and thus HARQ performance is improved. In addition, the performance of HARQ is improved as the number of retransmissions increases.

Figure 12:
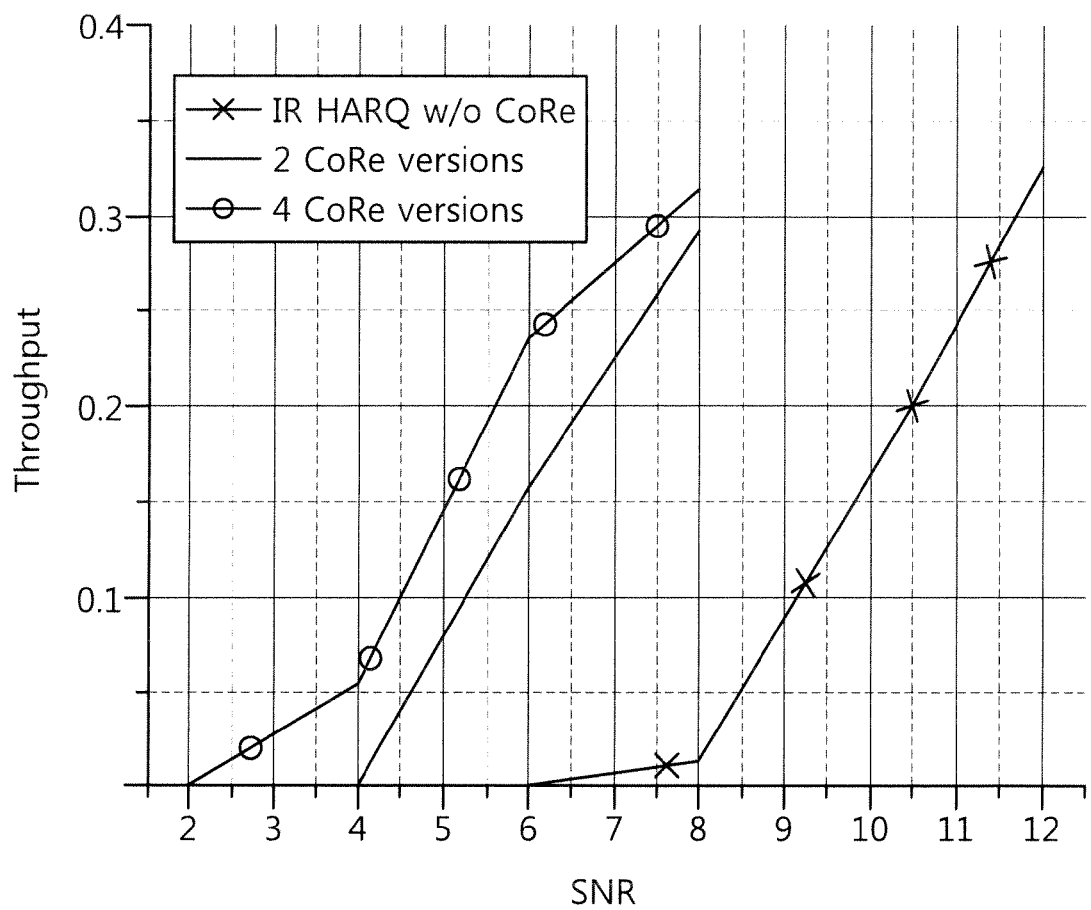
FIG. 12 is a graph showing a performance difference depending on the number of CRVs when HARQ is performed based on IR HARQ.

FIG. 12 is a graph showing a performance difference depending on the number of CRVs when HARQ is performed based on IR HARQ. The performance of HARQ can be known according to a relation between an SNR and a throughput. 64 QAM is used as a modulation scheme, and a ½ CTC is used. Referring to FIG. 12, as the number of CRVs increases to 2 and 4, the throughput against the SNR increases and thus the performance of HARQ is improved.

Figure 13:
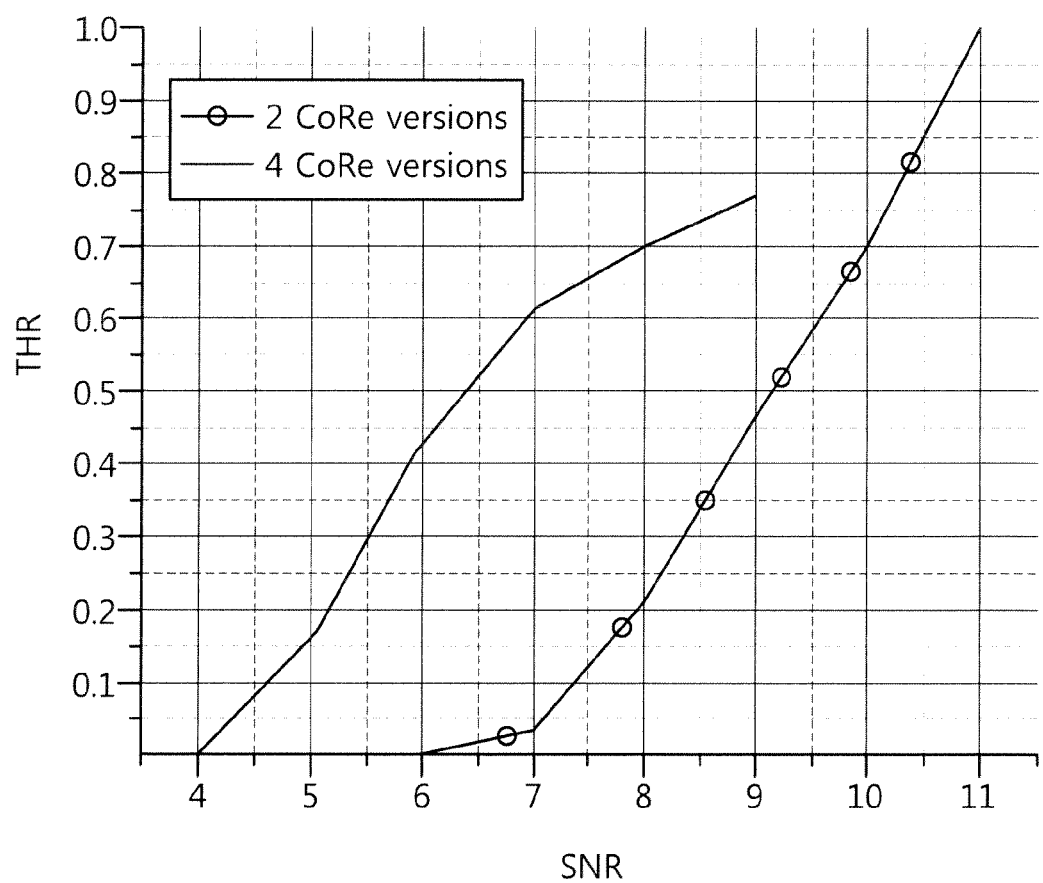
FIG. 13 is a graph showing a performance difference depending on the number of CRVs when HARQ is performed based on chase combining (CC) HARQ.

FIG. 13 is a graph showing a performance difference depending on the number of CRVs when HARQ is performed based on CC HARQ. 64 QAM is used as a modulation scheme, and a ½ CTC is used. Referring to FIG. 13, when the number of CRVs is 4, the throughput against the SNR increases, and thus the performance of HARQ is improved.

Figure 14:
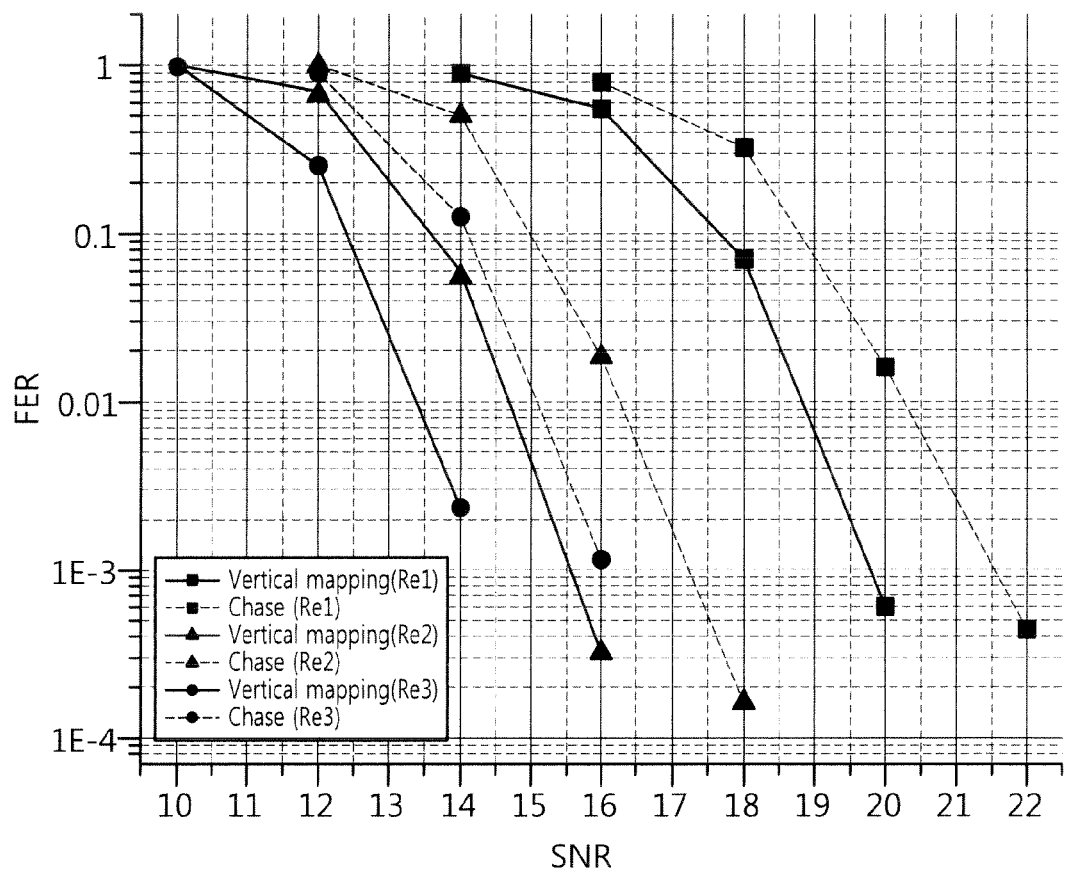
FIG. 14 is a graph showing a performance difference between CC HARQ and IR HARQ based on vertical mapping proposed in the present invention.

FIG. 14 is a graph showing a performance difference between CC HARQ and IR HARQ based on vertical mapping proposed in the present invention. 64 QAM is used as a modulation scheme, and a ½ CTC is used. Referring to FIG. 14, the CC HARQ is inferior in performance to the IR HARQ based on constellation rearrangement using vertical mapping proposed in the present invention. As the number of retransmissions increases, the performance of HARQ is improved.

Figure 15:
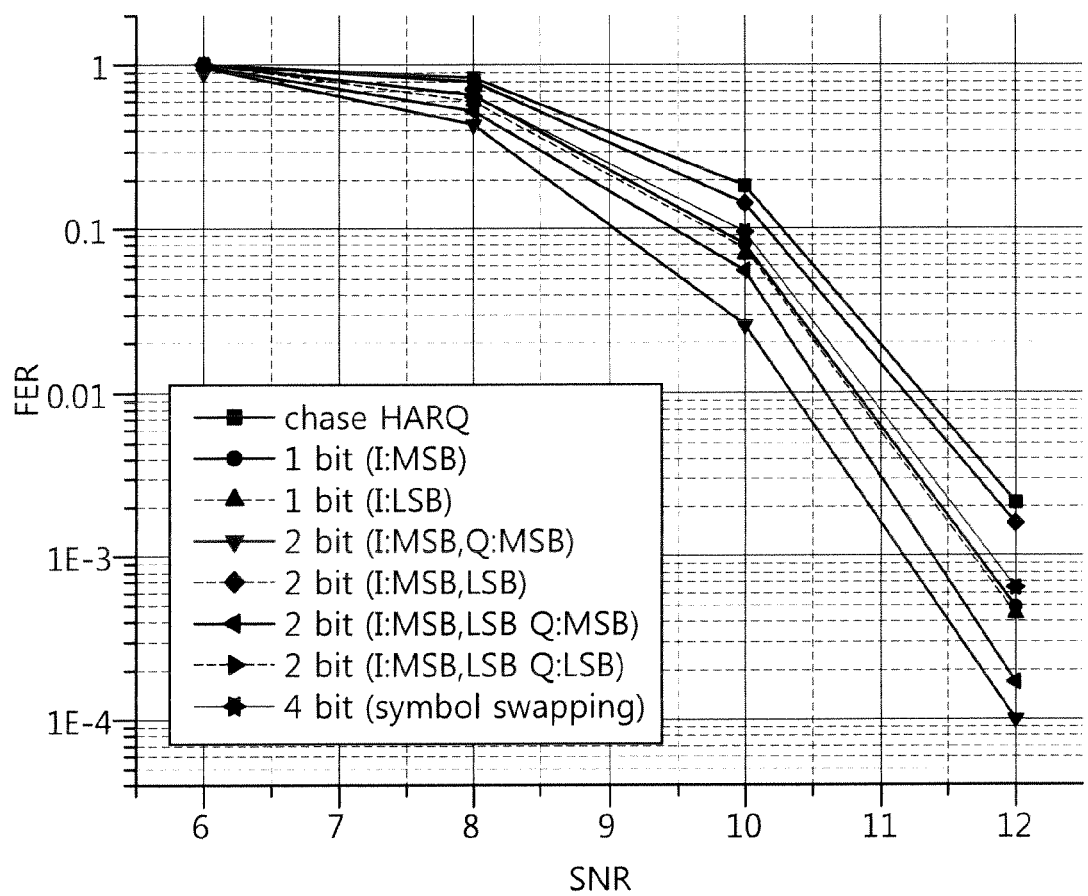
FIG. 15 is a graph showing a difference of HARQ performance according to various embodiments of vertical mapping among HARQ methods proposed in the present invention.
Figure 16:
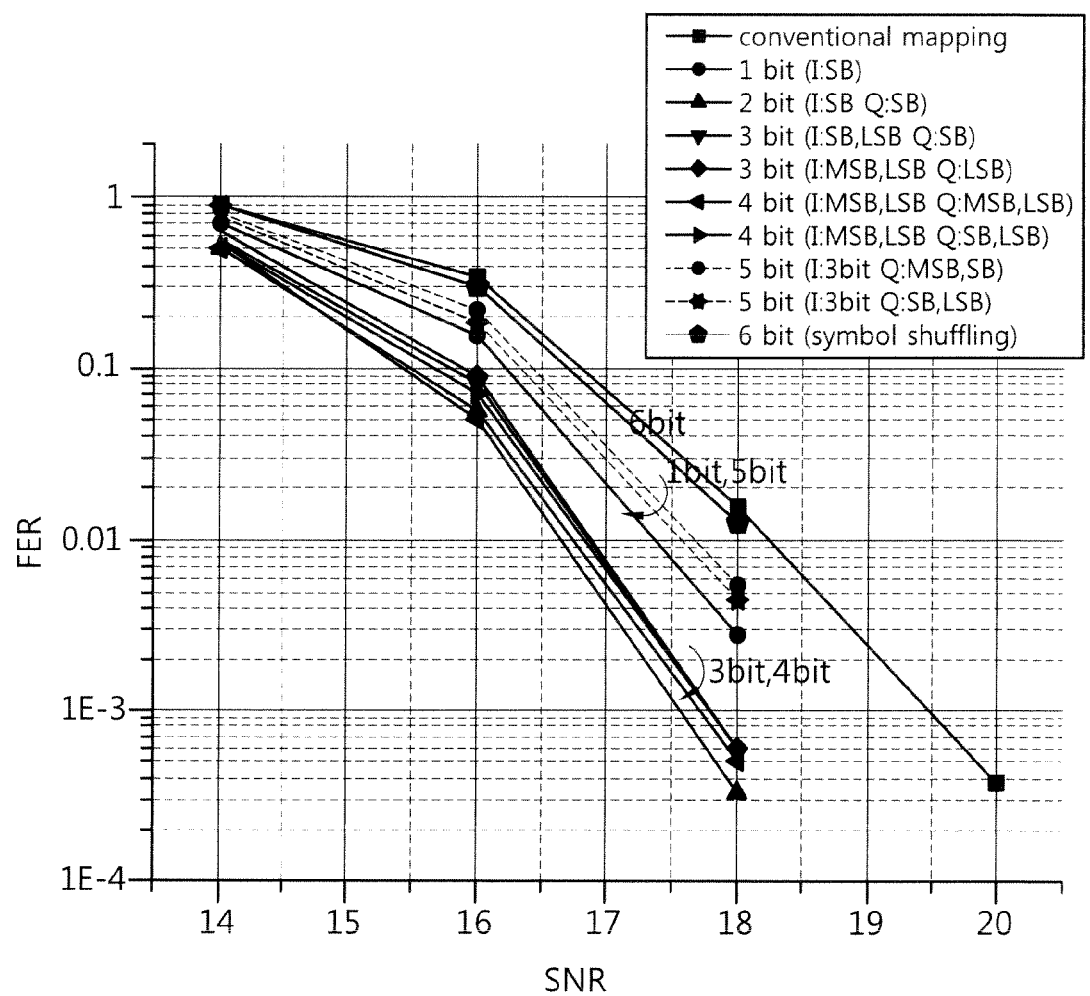
FIG. 16 is a graph showing a difference of HARQ performance according to various embodiments of vertical mapping among HARQ methods proposed in the present invention.

FIG. 15 and FIG. 16 are graphs showing a difference of HARQ performance according to various embodiments of vertical mapping among HARQ methods proposed in the present invention. In a legend of FIG. 15 and FIG. 16, N bit (I:A, Q:B) denotes that an A bit on the I-axis and a B bit on the Q-axis are swapped between two symbols. In FIG. 15, 16 QAM is used as a modulation scheme. In FIG. 16, 64 QAM is used as a modulation scheme. Referring to FIG. 15, among the various embodiments of vertical mapping, HARQ has best performance when using constellation rearrangement in which MSBs are swapped on the I-axis and MSBs are swapped on the Q-axis. Referring to FIG. 16, among the various embodiments of vertical mapping, HARQ has best performance when using constellation rearrangement in which SBs are swapped on the I-axis and SBs are swapped on the Q-axis. In addition, the CC HARQ is inferior in performance to the HARQ method based on constellation rearrangement of vertical mapping. The constellation rearrangement based on swapping of each bit increases the HARQ performance in comparison with constellation rearrangement based on swapping of each symbol.

Figure 17:
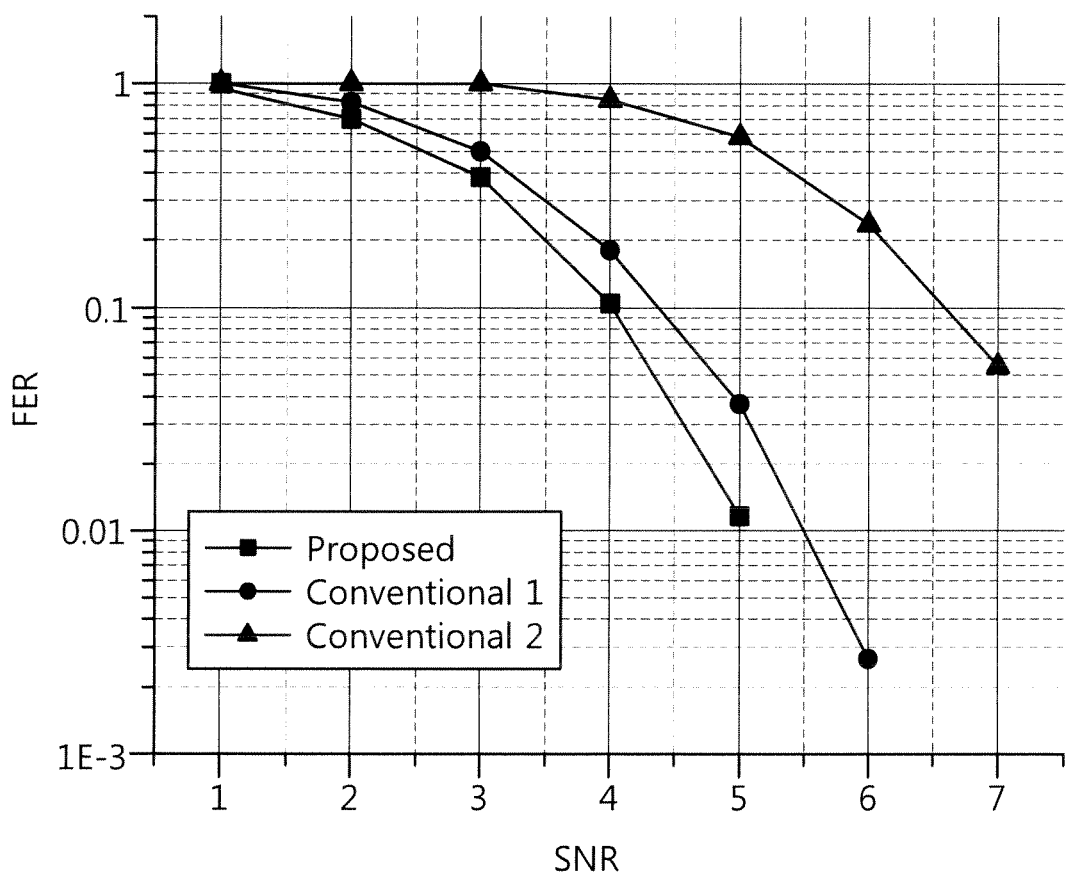
FIG. 17 is a graph showing a difference of HARQ performance between HARQ based on the proposed HARQ method and CC HARQ in an institute of electrical and electronics engineers (IEEE) 802.16e system when using a 16-QAM modulation scheme.

FIG. 17 is a graph showing a difference of HARQ performance between HARQ based on the proposed HARQ method and CC HARQ in an IEEE 802.16e system when using the 16-QAM modulation scheme. An experiment is conducted by using a ½ CTC and a vehicle driving at 120 km/h. Referring to FIG. 17, the HARQ based on the proposed HARQ method obtains a gain of 2.6 dB in a level of 10% FER in comparison with the CC HARQ.

Figure 18:
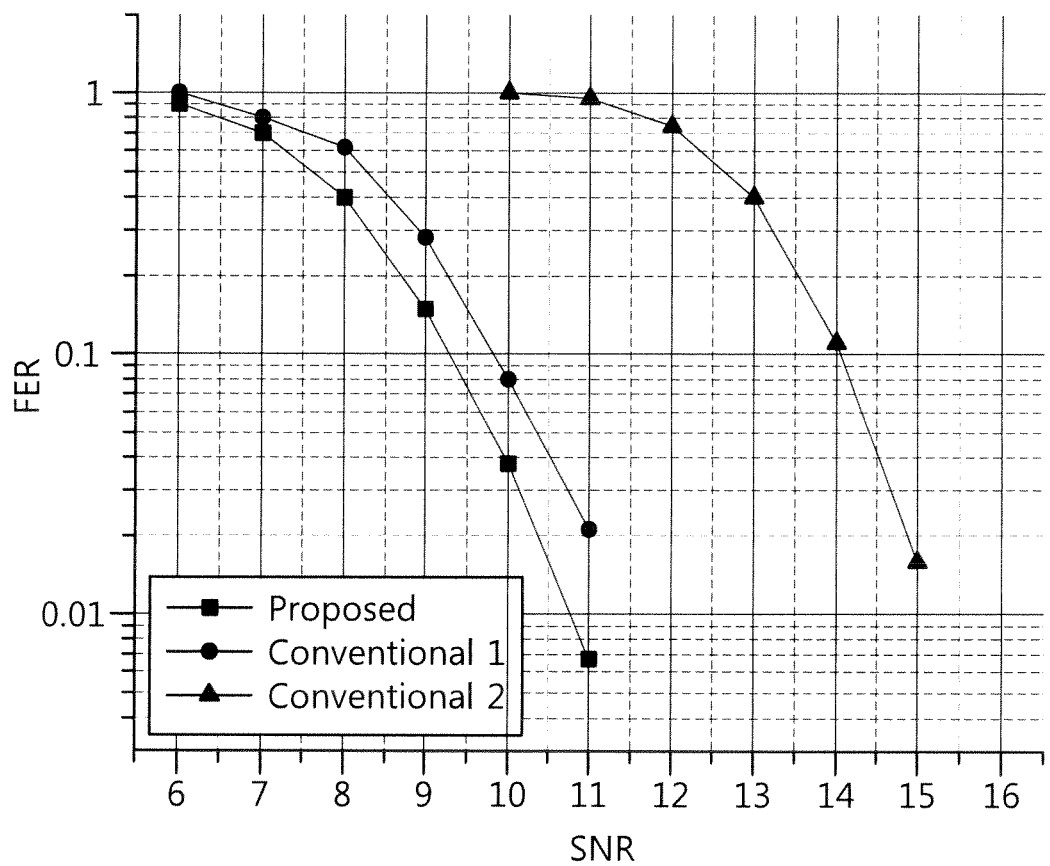
FIG. 18 is a graph showing a performance difference between HARQ based on the proposed HARQ method and CC HARQ in an IEEE 802.16e system when using a 64-QAM modulation scheme.

FIG. 18 is a graph showing a performance difference between HARQ based on the proposed HARQ method and CC HARQ in an IEEE 802.16e system when using the 64-QAM modulation scheme. An experiment is conducted by using a ½ CTC and a vehicle driving at 120 km/h. Referring to FIG. 18, the HARQ based on the proposed HARQ method obtains a gain of 4.7 dB in a level of 10% FER in comparison with the CC HARQ.

Figure 19:
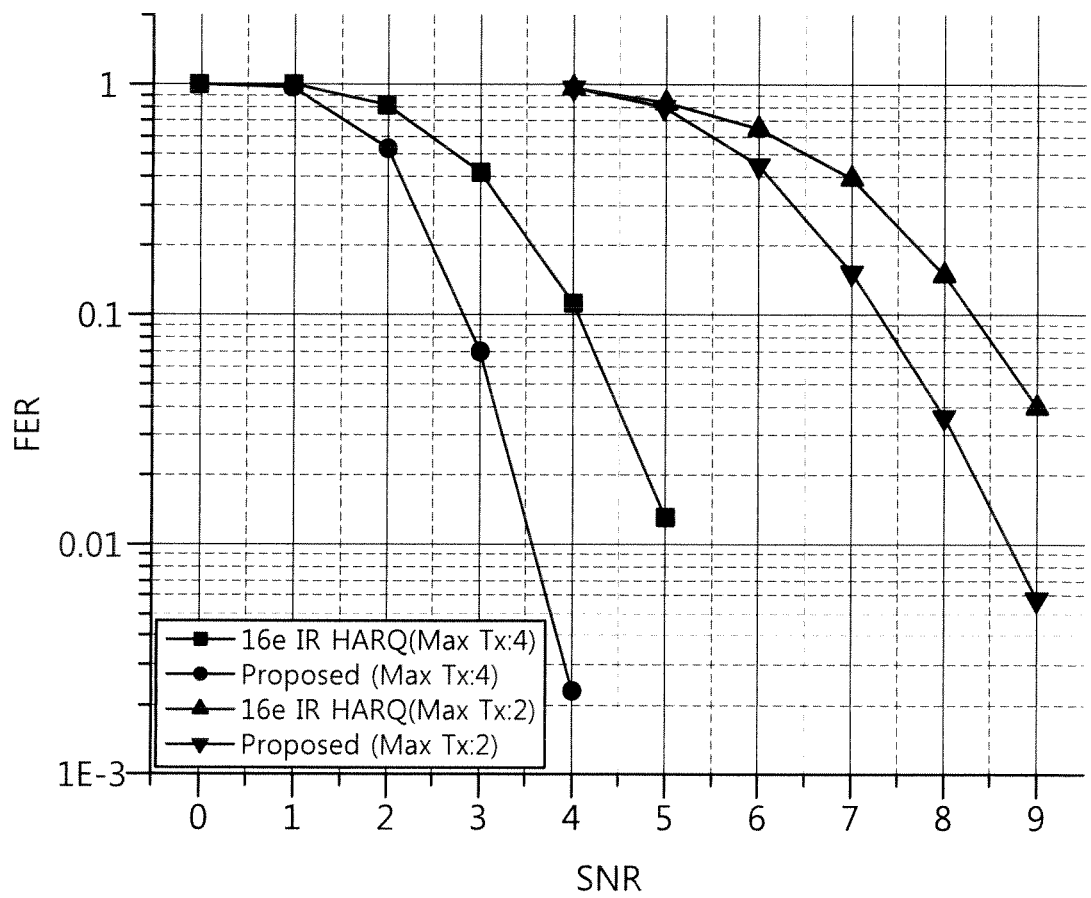
FIG. 19 is a graph showing a performance difference between HARQ based on the proposed HARQ method and IR HARQ in an IEEE 802.16e system when using a 16-QAM modulation scheme.

FIG. 19 is a graph showing a performance difference between HARQ based on the proposed HARQ method and IR HARQ in an IEEE 802.16e system when using the 16-QAM modulation scheme. An experiment is conducted by using a ½ CTC and a vehicle driving at 3 km/h. Referring to FIG. 19, the HARQ based on the proposed HARQ method obtains a gain of 1.0 dB when a maximum transmission number is 2 and a gain of 1.3 dB when the maximum transmission number is 4 in a level of 10% FER in comparison with the IR HARQ.

Figure 20:
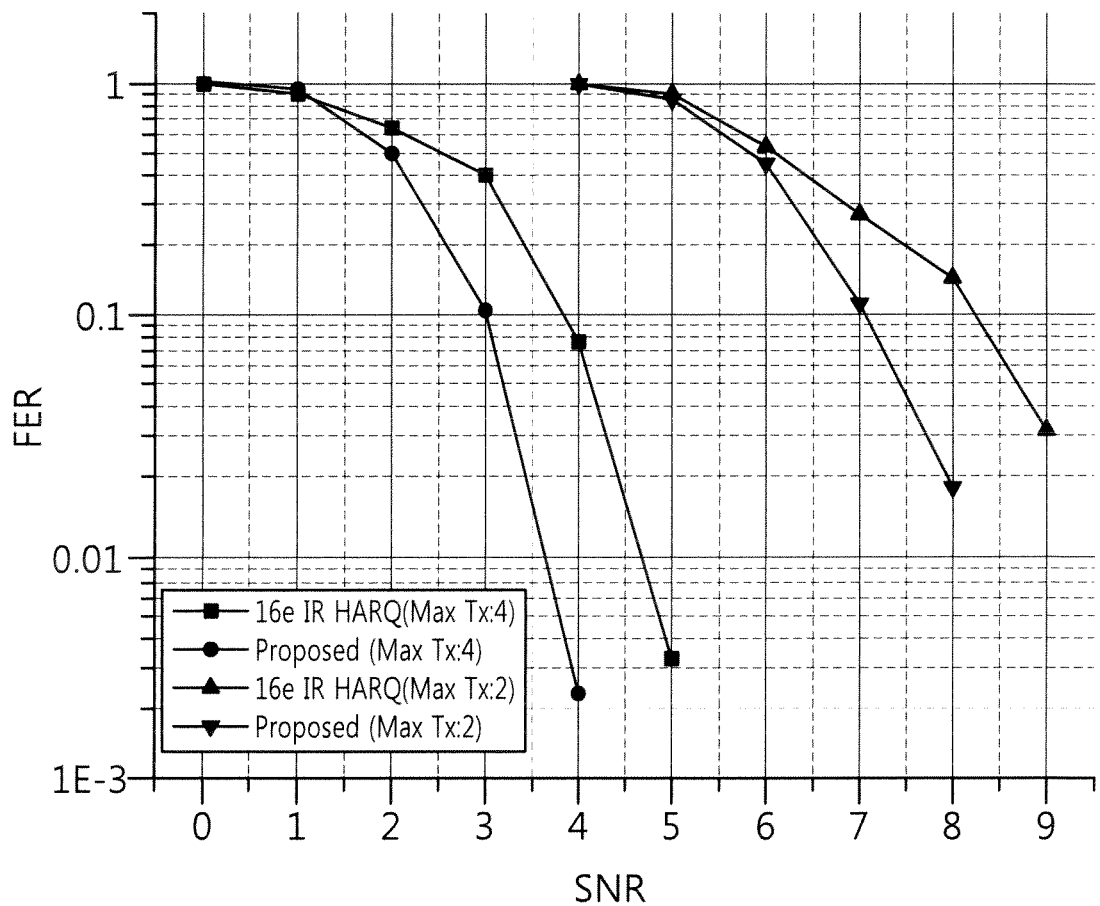
FIG. 20 is a graph showing a performance difference between HARQ based on the proposed HARQ method and IR HARQ in an IEEE 802.16e system when using a 16-QAM modulation scheme.

FIG. 20 is a graph showing a performance difference between HARQ based on the proposed HARQ method and IR HARQ in an IEEE 802.16e system when using the 16-QAM modulation scheme. An experiment is conducted by using a ½ CTC and a vehicle driving at 120 km/h. Referring to FIG. 20, the HARQ based on the proposed HARQ method obtains a gain of 1.2 dB when a maximum transmission number is 2 and a gain of 0.8 dB when the maximum transmission number is 4 in a level of 10% FER in comparison with the IR HARQ.

Figure 21:
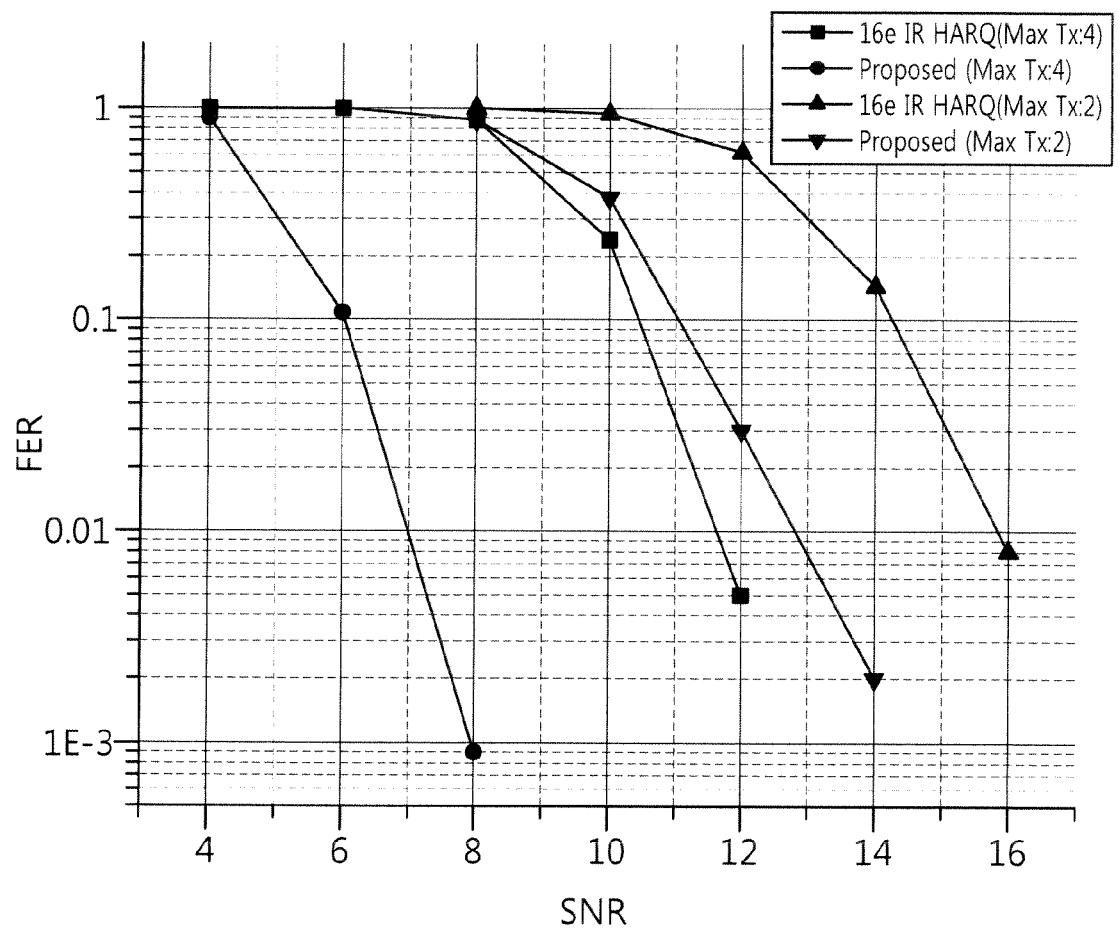
FIG. 21 is a graph showing a performance difference between HARQ based on the proposed HARQ method and IR HARQ in an IEEE 802.16e system when using a 64-QAM modulation scheme.

FIG. 21 is a graph showing a performance difference between HARQ based on the proposed HARQ method and IR HARQ in an IEEE 802.16e system when using the 64-QAM modulation scheme. An experiment is conducted by using a ½ CTC and a vehicle driving at 3 km/h. Referring to FIG. 21, the HARQ based on the proposed HARQ method obtains a gain of 3.1 dB when a maximum transmission number is 2 and a gain of 4.2 dB when the maximum transmission number is 4 in a level of 10% FER in comparison with the IR HARQ.

Figure 22:
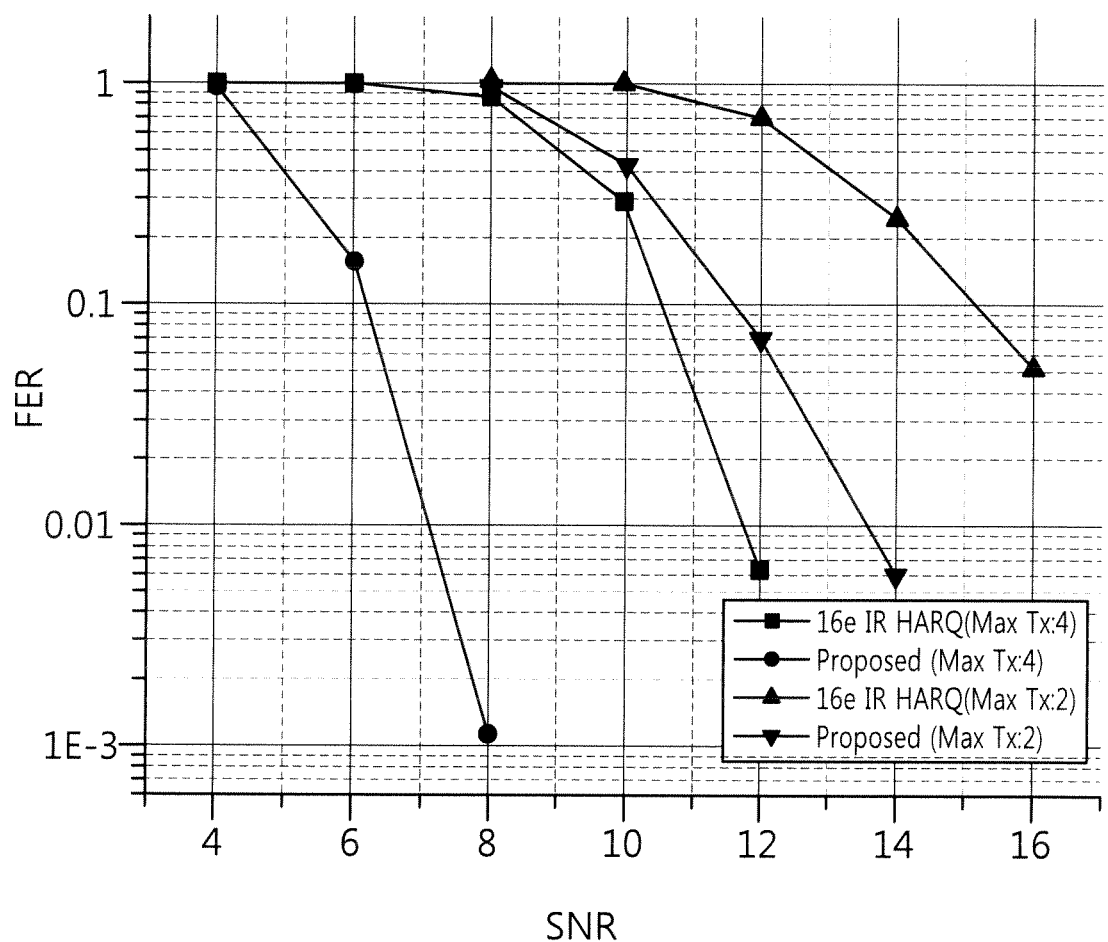
FIG. 22 is a graph showing a performance difference between HARQ based on the proposed HARQ method and IR HARQ in an IEEE 802.16e system when using a 64-QAM modulation scheme.

FIG. 22 is a graph showing a performance difference between HARQ based on the proposed HARQ method and IR HARQ in an IEEE 802.16e system when using the 64-QAM modulation scheme. An experiment is conducted by using a ½ CTC and a vehicle driving at 120 km/h. Referring to FIG. 22, the HARQ based on the proposed HARQ method obtains a gain of 3.3 dB when a maximum transmission number is 2 and a gain of 4.2 dB when the maximum transmission number is 4 in a level of 10% FER in comparison with the IR HARQ.

Figure 23:
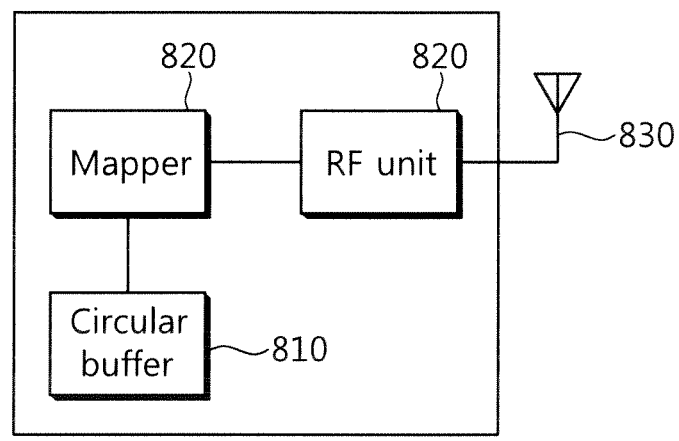
FIG. 23 is a block diagram showing an example of a transmitter according to an embodiment of the present invention.

FIG. 23 is a block diagram showing an example of a transmitter according to an embodiment of the present invention.

A transmitter 800 includes a circular buffer 810, a mapper 820, and a radio frequency (RF) unit 830. The circular buffer 810 and the mapper 820 implement a proposed function, process, and/or method.

The circular buffer 810 stores an encoded information bit. The mapper 820 selects a transport block from the circular buffer 810, and maps a bit set including n bits of the transport block to a data symbol on a constellation for $2^n$-QAM modulation according to a first mapping order. When bits of the transport block are subject to wrap-around at the end of the circular buffer 810, the bit set is mapped according to a second mapping order. The RF unit 830 is coupled to the mapper 820, and transmits and/or receives a radio signal.

The circular buffer 810 and the mapper 820 may include an application-specific integrated circuit (ASIC), another chip set, a logical circuit, and/or a data processing unit. The RF unit 830 may include a baseband circuit for processing radio signals. When the embodiment is implemented in software, the aforementioned methods can be implemented with a module (i.e., process, function, etc.) for performing the aforementioned functions. The module may be performed by the circular buffer 810 and the mapper 820.

Figure 24:
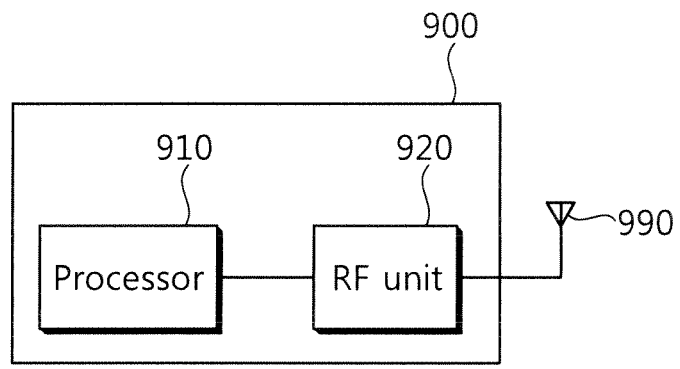
FIG. 24 is a block diagram showing another example of a transmitter according to an embodiment of the present invention.

FIG. 24 is a block diagram showing another example of a transmitter according to an embodiment of the present invention.

A transmitter 900 includes a processor 910 and an RF unit 920. The processor 910 implements a proposed function, process, and/or method.

The processor 910 stores an encoded information bit in a circular buffer, selects a transport block from the circular buffer, and maps a bit set including n bits of the transport block to a data symbol on a constellation for $2^n$-QAM modulation according to a first mapping order. In this case, when bits of the transport block are subject to wrap-around at the end of the circular buffer, the bit set is mapped according to a second mapping order. The RF unit 920 is coupled to the processor 910, and transmits and/or receives a radio signal.

The processor 910 may include an ASIC, another chip set, a logical circuit, and/or a data processing unit. The RF unit 920 may include a baseband circuit for processing radio signals. When the embodiment is implemented in software, the aforementioned methods can be implemented with a module (i.e., process, function, etc.) for performing the aforementioned functions. The module may be performed by the processor 910.

According to the present invention, an additional diversity gain can be obtained by using constellation rearrangement in a multiple input multiple output (MIMO) system. Therefore, performance of a wireless communication system can be improved.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of performing hybrid automatic repeat request (HARQ) increment redundancy (IR) in a wireless communication system, the method comprising:
storing encoded information bits in a circular buffer;
selecting a transport block from the encoded information bits stored in the circular buffer to perform the HARQ IR, wherein a starting point of the transport block is changed for HARQ retransmission;
selecting a mapping rule to map the transport block on a constellation for $2^m$-Quadrature Amplitude Modulation (QAM), wherein m is a modulation order and the mapping rule is changed when transmitted bits wrap-around at an end of the circular buffer, and wherein the mapping rule is selected as a first mapping rule or a second mapping rule;
mapping the transport block to data symbols according to the mapping rule, wherein if the transport block includes n bits represented by $\{b_0, \ldots, b_{n-1}\}$, the first mapping rule for the n bits is represented by $\{b_0, \ldots, b_{n-1}\}$ and the second mapping rule for the n bits is represented by $\{b_{n-1}, \ldots, b_0\}$; and
transmitting the data symbols to a receiver,
wherein n indicates a size of the encoded information bits included in the transport block.

2. The method of claim 1, wherein:
each 2m bits of the transport block are mapped to each pair of two data symbols on the constellation for $2^m$-QAM; and
each pair of two data symbols includes an even symbol and an odd symbol.

3. The method of claim 2, wherein each pair of two data symbols uses a same mapping rule.

4. A transmitter for performing hybrid automatic repeat request (HARQ) increment redundancy (IR) in a wireless communication system, the transmitter comprising:
- a circular buffer configured to store encoded information bits;
- a radio frequency unit configured to transmit data symbols to a receiver; and
- a mapper configure to:
  - select a transport block from the encoded information bits stored in the circular buffer to perform the HARQ IR, wherein a starting point of the transport block is changed for HARQ retransmission;
  - select a mapping rule to map the transport block including a plurality of bits on a constellation for $2^m$-Quadrature Amplitude Modulation (QAM), wherein m is a modulation order and the mapping rule is changed when transmitted bits wrap-around at an end of the circular buffer and wherein the mapping rule is selected as a first mapping rule or a second mapping rule; and
- map the transport block to the data symbols according to the mapping rule,
- wherein the plurality of bits are mapped to the constellation for the $2^m$-QAM in an original order of the plurality of bits if the first mapping rule is selected, and
- wherein the plurality of bits are mapped to the constellation for the $2^m$-QAM in a reverse order of the plurality of bits if the second mapping rule is selected.

5. The transmitter of claim 4, wherein:
the transport block includes n bits represented by $\{b_0, \ldots, b_{n-1}\}$;
the first mapping rule for the n bits is represented by $\{b_0, \ldots, b_{n-1}\}$;
the second mapping rule for the n bits is represented by $\{b_{n-1}, \ldots, b_0\}$; and
n indicates a size of the encoded information bits included in the transport block.

6. The transmitter of claim 4, wherein:
each 2m bits in the transport block are mapped to each pair of two data symbols on the constellation for $2^m$-QAM; and
each pair of two data symbols includes an even symbol and an odd symbol.

* * * * *